(12) United States Patent
Kawaguchi et al.

(10) Patent No.: US 9,928,879 B2
(45) Date of Patent: Mar. 27, 2018

(54) VIDEO PROCESSING METHOD, AND VIDEO PROCESSING DEVICE

(71) Applicant: PANASONIC CORPORATION, Osaka (JP)

(72) Inventors: Kyoko Kawaguchi, Tokyo (JP); Masamoto Tanabiki, Kanagawa (JP)

(73) Assignee: PANASONC CORPORATION, Osaka (JP)

( * ) Notice: Subject to any disclaimer, the term of this patent is extended or adjusted under 35 U.S.C. 154(b) by 0 days.

(21) Appl. No.: 15/312,692

(22) PCT Filed: Jun. 3, 2015

(86) PCT No.: PCT/JP2015/002808
§ 371 (c)(1),
(2) Date: Nov. 21, 2016

(87) PCT Pub. No.: WO2015/190071
PCT Pub. Date: Dec. 17, 2015

(65) Prior Publication Data
US 2017/0206932 A1 Jul. 20, 2017

(30) Foreign Application Priority Data
Jun. 10, 2014 (JP) .................................. 2014-119902
Jul. 24, 2014 (JP) .................................. 2014-150720

(51) Int. Cl.
*G11B 27/10* (2006.01)
*G06T 7/20* (2017.01)
(Continued)

(52) U.S. Cl.
CPC ................ *G11B 27/10* (2013.01); *G06T 7/20* (2013.01); *G06T 7/70* (2017.01); *H04N 9/87* (2013.01); *G06T 2207/30221* (2013.01)

(58) Field of Classification Search
CPC .. G11B 27/10; G06T 7/70; G06T 7/20; H04N 9/87
See application file for complete search history.

(56) References Cited

U.S. PATENT DOCUMENTS 6,389,073 B1 * 5/2002 Kurobe ................ H04N 19/139
375/240.03
7,312,812 B2 * 12/2007 Li ........................ G06F 17/3061
348/157

(Continued)

FOREIGN PATENT DOCUMENTS

| EP | 1265154 | 12/2002 |
| JP | 05-253324 | 10/1993 |

(Continued)

OTHER PUBLICATIONS

International Search Report (ISR) from International Searching Authority (Japan Patent Office) in International Pat. Appl. No. PCT/JP2015/002808, dated Sep. 8, 2015.

(Continued)

*Primary Examiner* — Mishawn Hunter
(74) *Attorney, Agent, or Firm* — Greenblum & Bernstein, P.L.C.

(57) ABSTRACT

This technology is a video processing method and a video processing device, in which a processor performs processing on video data of video obtained by capturing a sports game. A processor receives video data, calculates a motion amount of a player for each frame, from the received video data, and estimates at least one of a start frame of a play in the game, and an end frame at which an immediately preceding play, that is a one-previous play of the play, is ended, based on the calculated motion amount.

12 Claims, 22 Drawing Sheets

(51) Int. Cl.
G06T 7/70 (2017.01)
H04N 9/87 (2006.01)

(56) References Cited

U.S. PATENT DOCUMENTS

| | | | |
|---|---|---|---|
| 8,803,913 B1* | 8/2014 | Edmonston | G06T 7/20 345/629 |
| 2012/0064969 A1* | 3/2012 | Uchibori | A63F 13/335 463/29 |
| 2014/0168517 A1* | 6/2014 | Petajan | G06F 17/30038 348/576 |
| 2015/0016685 A1 | 1/2015 | Matsunaga et al. | |

FOREIGN PATENT DOCUMENTS

| | | |
|---|---|---|
| JP | 2003-143546 | 5/2003 |
| JP | 2004-260765 | 9/2004 |
| JP | 2013-188426 | 9/2013 |

OTHER PUBLICATIONS

Kobayashi et al., "Detection of Biased Broadcast Sports Video Highlights by Attribute-Based Tweets Analysis", Advances in Multimedia Modeling Lecture Notes in Computer Science vol. 7733, pp. 364-373 (2013).

Siddiquie et al., "Recognizing Plays in American Football Videos", Technical Report, (2009).

Direkoglu et al., "Team Activity Recognition in Sports", European Conference on Computer Vision 2012 (ECCV2012), vol. 7578, pp. 69-83 (2012).

Atmosukarto et al., "Automatic Recognition of Offensive Team Formation in American Football Plays", CVPR2013, pp. 991-998 (2013).

Farneback, "Two-Frame Motion Estimation Based on Polynomial Expansion", Proc. Scandinavian Conference on Image Analysis 2003 (SCIA2003) (2003).

"Knowledge Group 2 Group-2 Edition-4 Chapter, 4-1-1", Institute of Electronics, Information and Communication Engineers, pp. 2-7 (2013), together with a partial English language translation.

Dalal et al., "Histograms of Oriented Gradients for Human Detection", CVPR2005, pp. 886-893 (2005).

Viola et al., "Rapid Object Detection Using a Boosted Cascade of Simple Features", CVPR2001, vol. 1, pp. I-511-I-518 (2001).

Kurano et al., "Ball Tracking in Team Sports by Focusing on Ball Holder Candidates", International Workshop on Advanced Image Technology 2014 (IWAIT2014) (2014).

Yamamoto et al., "Multiple Players Tracking and Identification Using Group Detection and Player Number Recognition in Sports Video", 39th Annual Conference of the IEEE Industrial Electronics Society (IECON2013) (2013).

* cited by examiner

FIG. 21

|  | TOTAL NUMBER OF PLAY DETECTIONS | $frame_C$ | VIDEO AGGREGATION RATE C |
|---|---|---|---|
| PRESENT METHOD | 31 | 12094 | 13.44 |

FIG. 22

|  | AVERAGE ERROR | MINIMUM ERROR | MAXIMUM ERROR |
|---|---|---|---|
| ERROR BETWEEN ground truth AND PRESENT METHOD | 17.00 | 2.23 | 42.19 |

FIG. 23

|  | AVERAGE ERROR | MINIMUM ERROR | MAXIMUM ERROR |
|---|---|---|---|
| ERROR BETWEEN ground truth AND PRESENT METHOD | 45.96 | 10.98 | 76.35 |

VIDEO PROCESSING METHOD, AND VIDEO PROCESSING DEVICE

TECHNICAL FIELD

The present technology relates to a video processing method and a video processing device, which perform processing on video data of video obtained by capturing a sports game.

BACKGROUND ART

American football and soccer are competitive sports, especially popular in Europe and the United States.

In the fields of American football and soccer, analyzing video obtained by capturing a game, and providing the result of the analysis as a feedback to a practice or the next game or creating a highlight video have been actively carried out.

However, in an actual game, many periods are less important in terms of game analysis, and it takes great time costs to retrieve necessary parts from a long-time game video.

In an American football game, a period of time when offense and defense actions called "down" are performed (hereinafter, referred to as "play") and a period of time when the offense and defense actions are not performed are repeated. In other words, a period having a high degree of importance in terms of the analysis of an American football game is a section of play. Accordingly, it is desired that it is possible to extract efficiently and accurately at least one of a start point and an end point of the section of play, from the video data obtained by capturing an American football game.

In recent years, a study on the analysis of video obtained by capturing sports games (hereinafter, referred to as "sports video") has been actively conducted.

As a technology related to the analysis of sports video, there are a video summarizing method of extracting important sections from a long-time game video and creating a highlight video automatically, a tactic analysis method of analyzing the tactic and attack pattern of each team of the game by recognizing a formation, and the like. Further, in order to realize such contents, research of a video analyzing method has also been actively carried out which accurately extracts information about players or a ball from video data, in view of each player behind other players and a change in an illumination condition.

For example, an example of the video summarizing method which has been proposed conventionally includes a method of extracting the start point of the play of an American football game, based on the feature such as the color (hue, saturation, brightness, or the like) of a video and the camera work (for example, see PTL 1). Further, there is also a method of creating a highlight video by calculating a degree of importance in a sports video, from the contents written in the twitter (registered trademark) or the amount of posts within a fixed time, and determining a key frame (see NPL 1).

Further, examples of the tactic analysis method which has been proposed conventionally include a play analysis method of recording the behavior of a player during a game (for example, see NPL 2), and a tactic analysis method of recording the behaviors of all players of a team (for example, see NPL 3). In addition, the examples also include replay of a highlight scene, or creation of video of a certain player at a start point. In addition, there is also a formation recognition method of classifying a formation type, by automatically detecting a scrimmage line, which is an initial formation, from the video obtained by capturing an American football game (for example, see NPL 6).

Therefore, it is considered that important parts of a game are extracted from a video of an American football game, by using these related arts.

However, in the method described in PTL 1, there is a risk that accuracy decreases due to the color environment of video and camera work. Further, in the method described in NPL 1, since it is necessary to use media information other than the sports video which are written in twitter (registered trademark), it is possible to cope only with a large-scale broadcast video such as terrestrial video. Further, in the methods described in NPL 2, and NPL 3, it is necessary to use a plurality of camera videos, or manually perform the detection or tracking of players and a ball. Further, in the method described in NPL 4, since only the information of the initial formation, of which detection is relatively easier, is extracted, it is insufficient as an information quantity for tactical analysis.

That is, even if the related arts are used, it is difficult to extract a play section from a video obtained by capturing a sports game, efficiently and with high precision.

An object of the present technology is to provide a video processing method and a video processing device, capable of extracting a play section from a video obtained by capturing a sports game, efficiently and with high precision.

CITATION LIST

Patent Literature

PTL 1: Japanese Patent Unexamined Publication No. 2003-143546

Non-Patent Literature

NPL 1: T. Kobayashi, H. Murase "Detection of biased Broadcast Sports Video Highlights by Attribute-Based Tweets Analysis", Advances in Multimedia Modeling Lecture Notes in Computer Science Volume 7733, 2013

NPL 2: Behjat Siddiquie, Yaser Yacoob, and Larry S. Davis "Recognizing Plays in American Football Videos", Technical Report, 2009

NPL 3: Cem Direkoglu and Noel E. O'Connor "Team Activity Recognition in Sports", European Conference on Computer Vision 2012 (ECCV2012), Vol. 7578, pp. 69-83, 2012.

NPL 4: Atmosukarto I., Ghanem B., Ahuja S. "Automatic Recognition of Offensive Team Formation in American Football Plays", CVPRW2013, pp. 991-998, 2013

SUMMARY OF THE INVENTION

This technology is a video processing method and a video processing device, in which a processor performs processing on video data of video obtained by capturing a sports game. A processor receives video data, calculates a motion amount of a player fore each frame, from the received video data, and estimates at least one of a start frame of a play in the game, and an end frame at which an immediately preceding play, that is a one-previous play of the play, is ended, based on the calculated motion amount.

According to the present technology, it is possible to extract a play section from a video obtained by capturing a sports game, efficiently and with high precision.

BRIEF DESCRIPTION OF DRAWINGS

FIG. 21 is a diagram illustrating an accuracy verification result of video aggregation in the video processing device according to the present embodiment.

FIG. 22 is a diagram illustrating, an accuracy verification result of a play start position by the video processing device according to the present embodiment.

FIG. 23 is a diagram illustrating an accuracy verification result of a play end position by the video processing device according to the present embodiment.

DESCRIPTION OF EMBODIMENTS

Hereinafter, an embodiment of the present technology will be described in detail, with reference to the drawings. In the present embodiment, an example in which video obtained by capturing an American football game is subjected to video processing will be described as an example of sports video.

<Rules of American Football>

First, an overview of a part concerning the start and end of a play in the rule of an American football game will be described.

Figure 1:
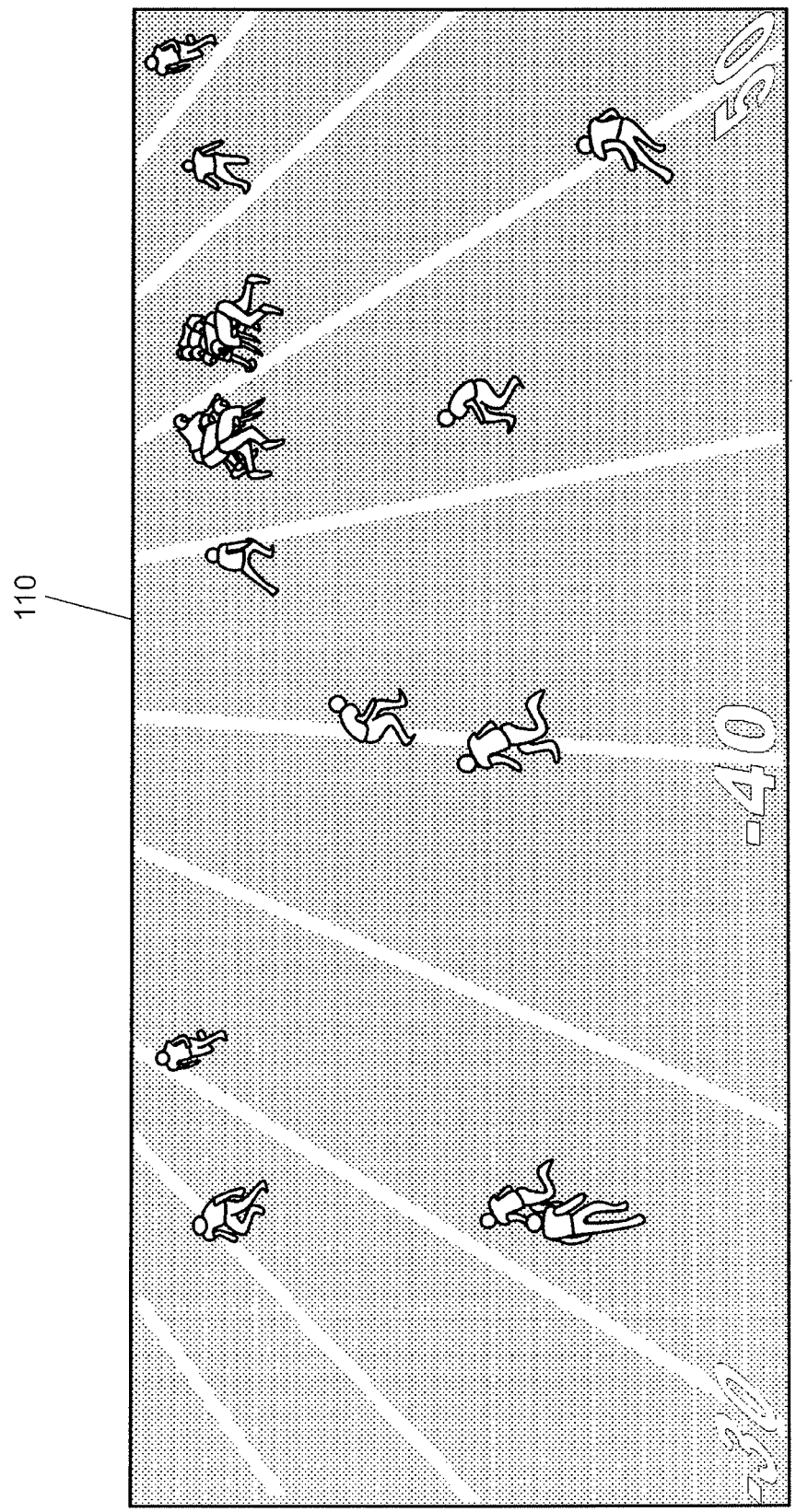
FIG. 1 is an explanatory diagram illustrating an example of a video that is used in an embodiment of the present technology.
Figure 2:
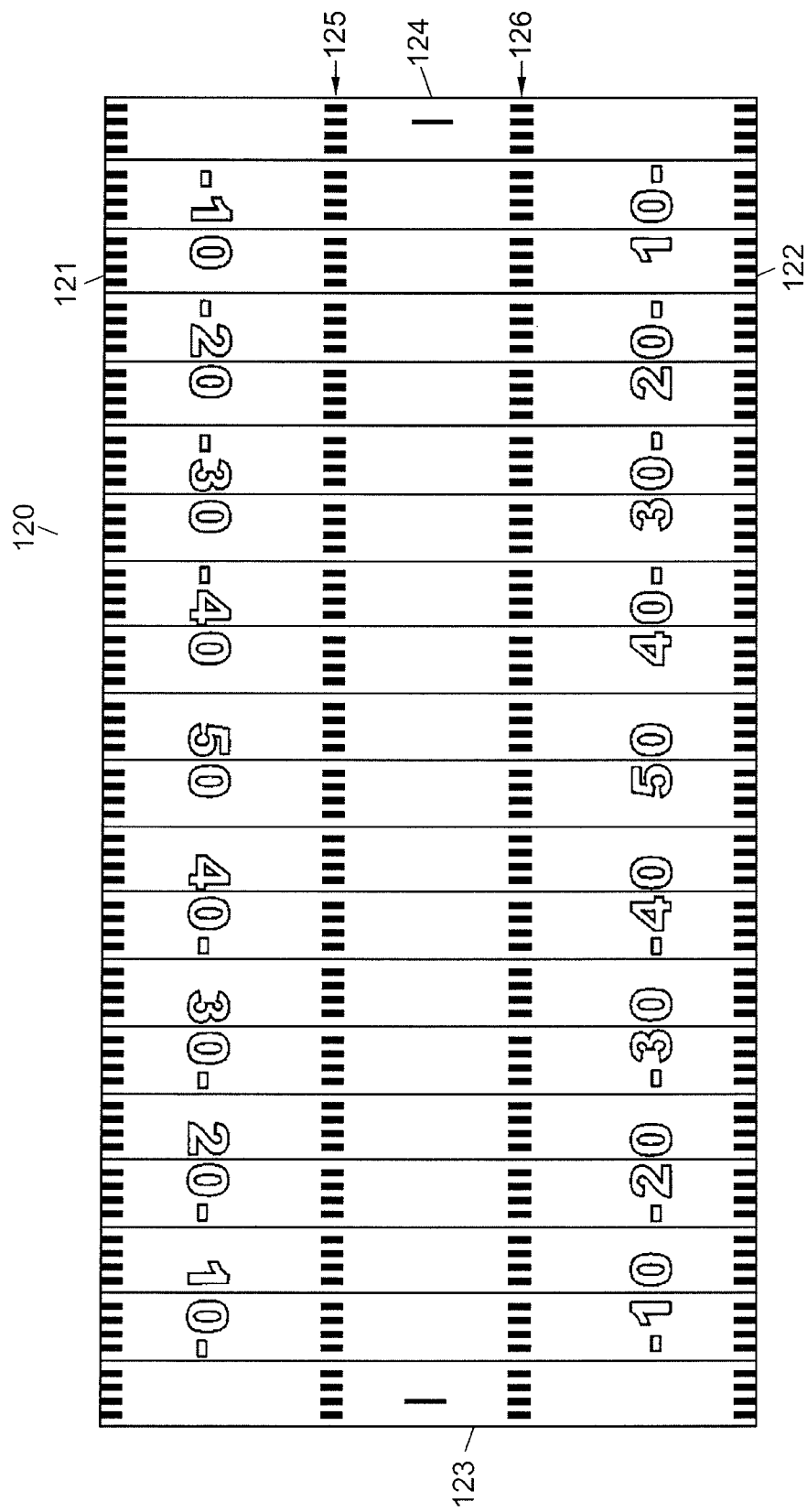
FIG. 2 is a plan view illustrating an example of a configuration of a field in American football which is a target in the present embodiment.

FIG. 1 is an explanatory diagram illustrating an example of a video that is obtained by capturing an American football game. FIG. 2 is a plan view illustrating an example of a configuration of a field in American football. FIG. 3 is an explanatory diagram illustrating an example of an initial formation of a play.

American football is a competition such as a prisoner's base battle which is performed by players divided into a defensive side and an offensive side. In American football, if a team is not able to make progress (gain) of 10 yards during four times of attack opportunities in a range (hereinafter, referred to as a "field") 120 which is surrounded by side lines 121 and 122 and goal lines 123 and 124, an attack right moves to the opposing team. For this reason, information indicating yards which are gained in an attack of one time is very important in the game analysis.

In American football, it is possible to clearly separate a play, in terms of the features of the rule.

A stream of one play is as follows.

Figure 3A:
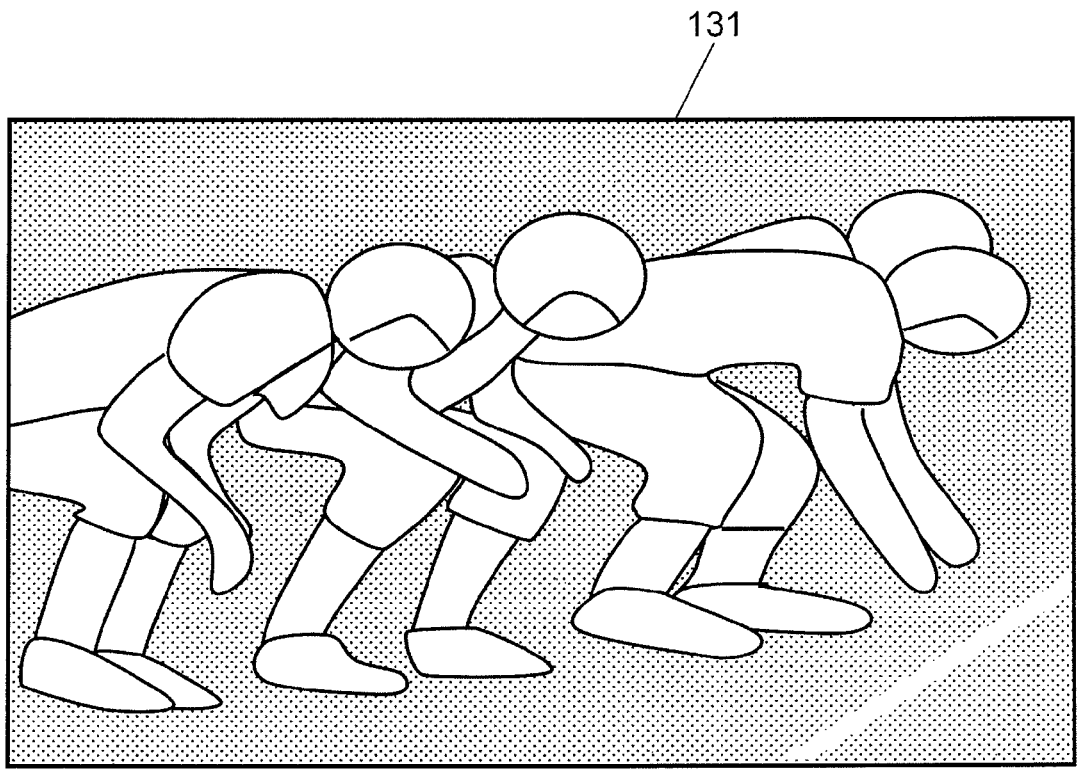
FIG. 3A is an explanatory diagram illustrating an example of an image obtained by capturing an initial formation of a play which is a target in the present embodiment.
Figure 3B:
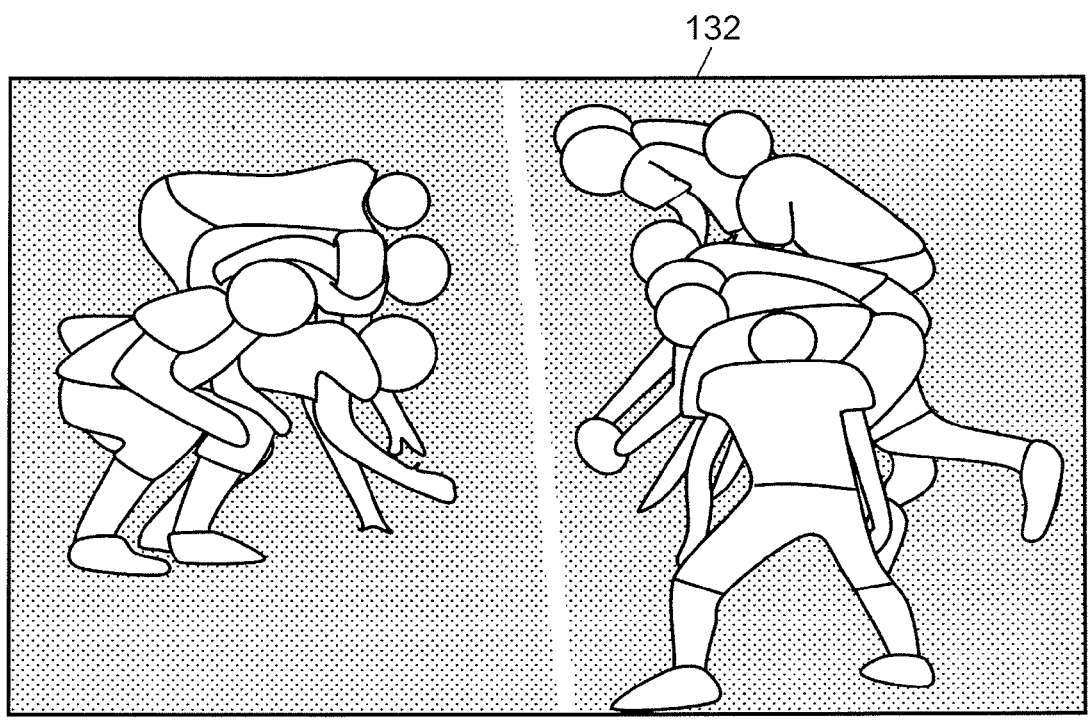
FIG. 3B is an explanatory diagram illustrating an example of an image obtained by capturing the initial formation of the play which is the target in the present embodiment.
Figure 3C:
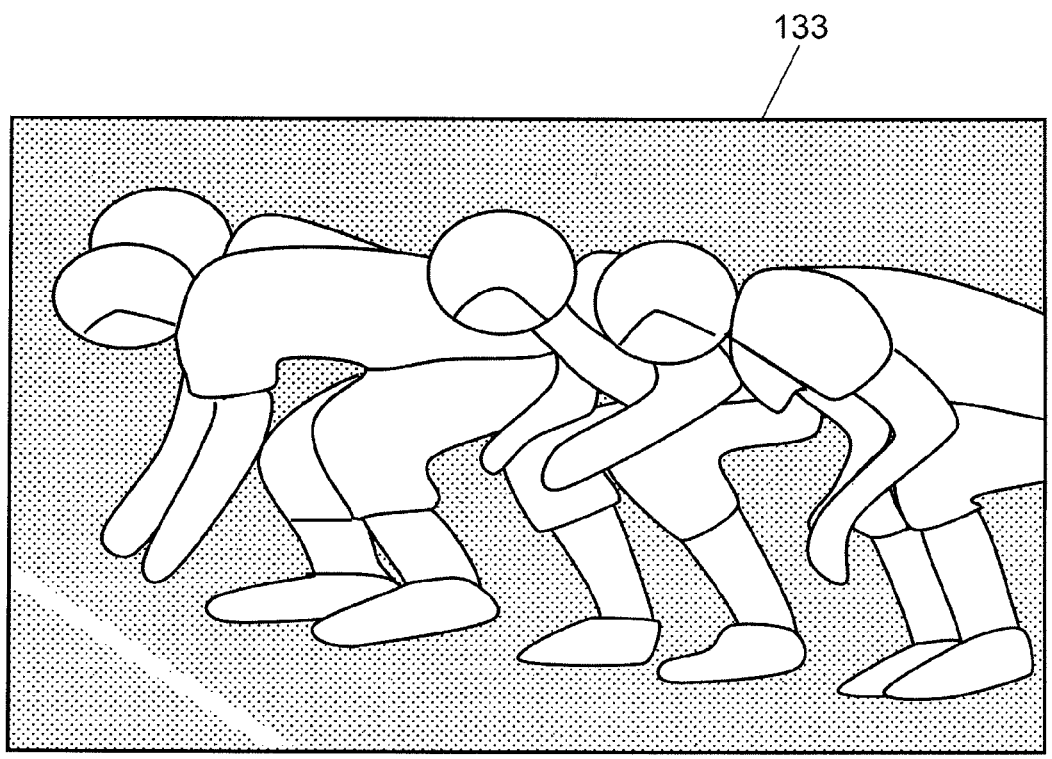
FIG. 3C is an explanatory diagram illustrating an example of an image obtained by capturing the initial formation of the play which is the target in the present embodiment.

First of all, the players of both teams organize initial formations 131 to 133 called scrimmage lines (see FIGS. 3A, 3B, and 3C). Then, a play is started, by a ball is thrown from the center of the initial formation. When the initial formation is organized, most of the players temporarily stop. Then, all players start to move all at once, at the same time as the start of the play. That is, when the play starts, most of the players start to move all at once from a state where they are once stood.

If a ball or a ball holder goes out of the side lines or the goal lines, or goes into an end zone, or the ball holder is brought down, the play is ended. When the play is ended, usually, multiple players are gathered toward the position of the ball (hereinafter referred to as "play end position"), and becomes a state in which players are crowded. In addition, when the play is ended, most of the players slows the speed of motion, and no longer perform actions involved with a sudden change in the motion such as dash or feint.

In a case where the play is ended, the next play is started from the play end position. However, in a case where the play is ended in the outside of two inbounds lines 125 and 126 (see FIG. 2), the next play is started on the inbounds lines 125 and 126 closer to the play end position. That is, a position at which each play is started, in other words, an initial formation is organized (hereinafter, referred to as "play start position") has a correlation with the play end position of a one-previous play.

In this way, the American football has, in terms of the nature of the rules, a feature that the movements of most of the players (the movements in the entire field) increase rapidly when the play is started, and a feature that the movements of most of the players decrease rapidly when the initial formation is organized or the play is ended. There is a characteristic that the play start position of each play has a correlation with the play end position of a one-previous play.

Therefore, in the present embodiment described below, the section of each play is estimated by extracting these features from the video data of video 110. More specifically, a frame corresponding to the start point of a play (hereinafter, referred to as "play start frame") and a frame corresponding to the end point of the play (hereinafter, referred to as "play start frame") are estimated, for each play, from frames constituting the video data.

The shapes of the initial formations 131 to 133 are less variable, even in a case where teams are different. On the other hand, the image of the initial formation that is displayed in the video becomes different, depending on the relationship between the position of the camera that captures the video 110, and the position in which the initial formation is assembled.

For example, FIG. 3A is an explanatory diagram illustrating an example of an image obtained by capturing initial formation 131 which is organized on the left side of the field, from a camera located in a position closer to the field center. FIG. 3B is an explanatory diagram illustrating an example of an image obtained by capturing initial formation 132 which is organized in the center of the field, from the same camera. For example, FIG. 3C is an explanatory diagram illustrating an example of an image obtained by capturing initial formation 133 which is organized on the right side of the field, from the same camera.

Therefore, in the present embodiment described below, the play start frame is estimated further by using the features of such initial formations or a change in the player movement near the play start time.

<Configuration of Video Processing Device>

Next, the configuration of a video processing apparatus using the American football video processing method according to the present embodiment will be described.

Figure 4:
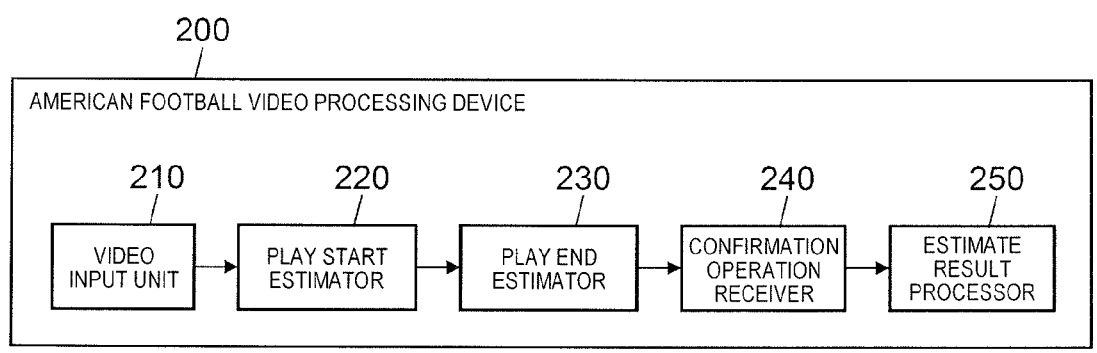
FIG. 4 is a block diagram illustrating an example of a configuration of a video processing device according to the present embodiment.

FIG. 4 is a block diagram illustrating an example of a configuration of a video processing device according to the present embodiment.

In FIG. 4, video processing device 200 includes video input unit 210, play start estimator 220, play end estimator 230, confirmation operation receiver 240, and estimate result processor 250.

Video input unit 210 inputs video data (hereinafter, referred to as "video") of video obtained by capturing an American football game (hereinafter, referred to as "game"). For example, video input unit 210 receives video, from the camera which is provided so as to capture the entire field of a game from the side, through a communication network. Then, video input unit 210 outputs the received video to play start estimator 220.

In the present embodiment, it is assumed that the video is obtained by capturing the entire field, as illustrated in FIG. 1. In addition, the video is, for example, time-series image data of 60 frames per second.

Play start estimator 220 estimates the play start position in the game, based on the received video.

For example, play start estimator 220 calculates the motion amounts of the various parts in the frame, for each frame. Further, play start estimator 220 detects the initial formation from the video, and estimates the play start frame and the play start position of each play, based on the motion amount and the detection result of the initial formation.

Here, the motion amount is information indicating at least one of the magnitude and direction of the movement, in a predetermined region within the video. The motion amount will be described later in detail.

Then, play start estimator 220 outputs video, motion amount information indicating the motion amount in each region of each frame, and start frame information indicating the play start frame and the play start position, which are estimated, to play end estimator 230.

In addition, the configuration of play start estimator 220 is an example, and the estimation of the play start position is not limited to the afore-mentioned example.

Here, a description will be given on an example in which play start estimator 220 estimates the play start frame and the play start position, by using a change in the player movement near the play start time. For example, play start estimator 220 estimates the play start frame and the play start position, by using the amount of a change (difference) in the luminance between the previous and subsequent frames. Specifically, play start estimator 220, for example, compares the luminance of the corresponding pixels, between two consecutive frames, and calculates a change in luminance of each pixel, and the total sum of the amounts of change in the luminance of all pixels.

It is estimated that a less amount of a change in the luminance indicates less movement of the player in the video. Then, the movement of the player is less just before the play is started. Accordingly, for example, play start estimator 220 estimates a frame in which the amounts of a change in the luminance of all of the pixels are less and/or several previous and subsequent frames of the frame, as the play start frame, based on the frame in which the amounts of a change in the luminance of all of the pixels are less.

It is estimated that a large (great) amount of a change in the luminance indicates great movement of the player in the video. Then, immediately after the play is started, the movement of the player in some regions in the image is large (great). Accordingly, for example, play start estimator 220 estimates a region having a large amount of a change in luminance after the play start frame, as a play start position.

In this case, play start estimator 220 outputs video, start frame information indicating the play start frame and the play start position, which are estimated, to play end estimator 230. As the elements for estimating the change in the movement of the player, other feature amounts of the pixel (the pixel includes a pixel or a set of pixels) such as brightness or RGB values rather than the luminance of the pixel may be used.

Play end estimator 230 estimates the end frame of a one-previous play (hereinafter, referred to as "immediately before play") of the play in the game, for each play, based on the start frame information, from the input video.

For example, play end estimator 230 estimates a region which is likely to be the end position of the immediately preceding play (hereinafter, referred to as "play end region"), based on the play start position indicated by the input start frame information. Further, play end estimator 230 extracts the position of the player (hereinafter, referred to as "player position") in each frame from the video, and calculates the density of the player position, based on the extracted player position. Further, play end estimator 230 calculates the concentration degree, based on the motion amount of each location of each frame indicated by the input motion amount information (or, motion amount information which is newly acquired by play start estimator 220).

Further, play end estimator 230 estimates the play end position, based on the density and the concentration degree which are calculated.

Here, the density (player density) is information indicating the degree of congestion of the player position in the frame. Further, the concentration degree (concentration degree in a progress destination) is information indicating a gathering condition in the direction of the movement of the player, and for example, a value calculated for each of grids which are set at regular intervals in the field. The details of the density and the concentration degree will be described later.

Further, play end estimator 230 estimates the play end frame of each play, based on the motion amount indicated by the input motion amount information, and whether or not the estimated play end position is included in the estimated play end region.

Then, play end estimator 230 outputs the input video and start frame information, and the end frame information indicating the play end frame and the play end position, which are estimated, to confirmation operation receiver 240.

Hereinafter, the play start frame that is estimated by play start estimator 220 is referred to as "start frame candidate". Hereinafter, the play end frame that is estimated by play end estimator 230 is referred to as "end frame candidate".

Confirmation operation receiver 240 generates and displays a confirmation operation reception screen, based on the video, the start frame information, and the end frame information, which are input.

Here, the confirmation operation reception screen is a screen for displaying, for each play, each start frame candidate which is estimated for the play, and one or a plurality of end frame candidates which are estimated for the immediately preceding play that is a one-previous play of the corresponding play, in association with each other. The details of the confirmation operation reception screen will be described later.

Confirmation operation receiver 240 receives a determination operation for the start frame candidate and the end frame candidate, which are displayed, and estimates the start frame candidate for which the determination operation is performed, as the play start frame, and the end frame candidate for which the determination operation is performed, as the play end frame, respectively.

For example, confirmation operation receiver 240 displays a confirmation operation reception screen, and receives an operation from the user for the displayed confirmation operation reception screen, through a user interface (not shown) such as a liquid crystal display equipped with a touch panel, provided in video processing device 200.

Then, confirmation operation receiver 240 outputs the video and play section information indicating the play start frame and the play end frame, which are estimated, to estimate result processor 250.

Estimate result processor 250 estimates a video part of a play section, from a video, based on the play start frame and the play end frame which are indicated by the input play section information, and displays the extracted result, for example, on the afore-mentioned display.

In addition, video processing device 200 includes, for example, although not shown, a processor (a central processing unit (CPU)), a storage medium such as a read only memory (ROM) that stores a control program, a working memory such as a random access memory (RAM), and a communication circuit. In this case, functions of the units described above are achieved by the processor (CPU) executing the control program.

Video processing device 200 having such a configuration is able to estimate a play section, in view of the characteristics of the movement and position of the player at the times of start and end of the play.

Here, the details of the motion amount, the initial formation detection, the density, and the concentration degree, which are described above, will be described in order.

<For Motion Amount>

In the present embodiment, the optical flow intensity of a dense optical flow is employed as the motion amount. That is, the motion amount is a value indicating the size of the movement of the player at each place in each direction.

Figure 5:
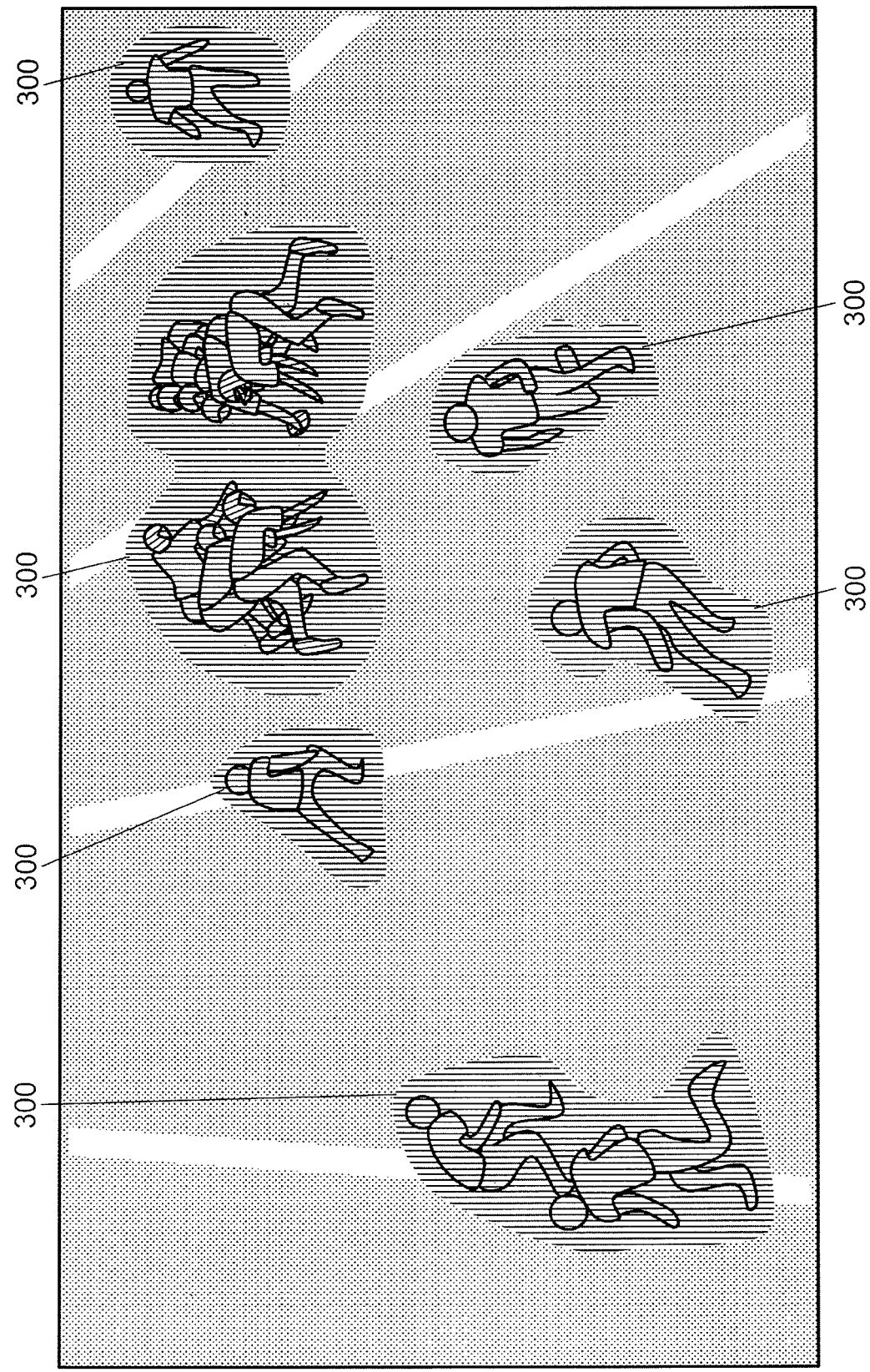
FIG. 5 is an explanatory diagram illustrating an example of optical flow intensity in the present embodiment.
Figure 6:
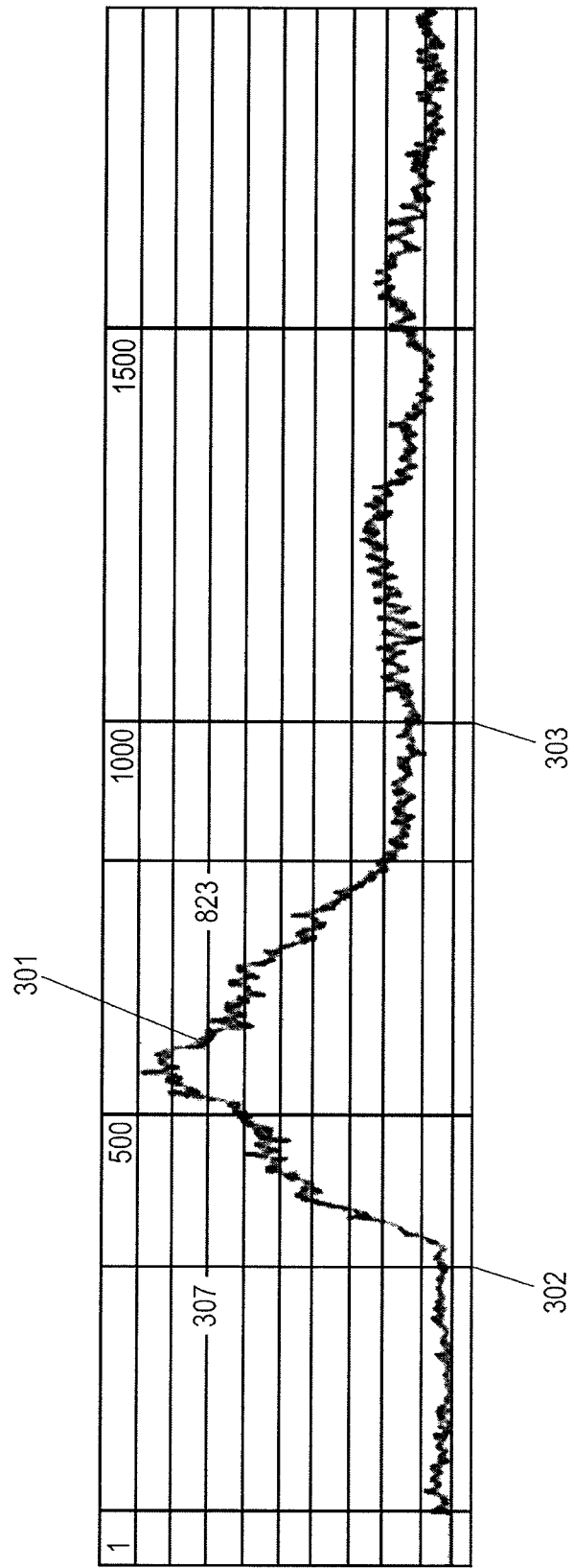
FIG. 6 is an explanatory diagram illustrating an example of time transition of total optical flow intensity in the present embodiment.

FIG. 5 is an explanatory diagram illustrating an example of an optical flow intensity (motion amount) which is obtained from a video. In FIG. 5, a dark-colored portion 300 indicates a portion having a great amount of motion. Further, FIG. 6 is an explanatory diagram illustrating an example of time transition of a total amount of optical flow intensity in one frame (hereinafter, referred to as "total optical flow intensity"). In FIG. 6, the vertical axis represents the total optical flow intensity and the horizontal axis represents time.

Play start estimator 220 displays a video on the user interface described above, and receives the designation of the field region in the video, by the touch operation by the user. Then, play start estimator 220 divides the designated region into, for example, small regions of 200×200 (hereinafter, referred to as a field grid). Play start estimator 220 obtains the optical flow intensity of the dense optical flow, by using a Farneback method (for example, see G. Farneback, "Two-Frame Motion Estimation Based on Polynomial Expansion", In Proc. Scandinavian Conference on Image Analysis 2003 (SCIA2003), 2003) for each field grid. Incidentally, it is desirable that play start estimator 220 applies a bilateral filter on a video, as a pretreatment, for noise removal.

Here, a calculation method of the optical flow intensity is not limited to the above-described method. For example, the optical flow intensity may be calculated using a Lucas-Kanade method (see "knowledge group 2 group-2 edition-4 chapter, 4-1-1", Institute of Electronics, Information and Communication Engineers, 2013, pp. 2-7).

The total optical flow intensity indicates the size of the movements of all of the players which are displayed in the video. In addition, as described above, in the American football game, when the play is started, the movements of most of the players rapidly increase, and when the play is ended, the movements of most of the players rapidly decrease. Accordingly, as illustrated in FIG. 6, the total optical flow intensity 301 increases rapidly immediately after the play start timing 302, and decreases rapidly immediately before the play end timing 303.

That is, the total optical flow intensity 301 calculated from the motion amount is a value is characteristically changing value at the frame start timing and the frame end timing.

<For Initial Formation Detection>

In the present embodiment, a method using a discriminator is employed as a detection method of an initial formation.

Play start estimator 220 includes in advance a discriminator (detector) that detects the initial formation from a video. This discriminator is generated, for example, by performing learning using Adaboost (for example, see P. Viola and M. Jones, "Rapid Object Detection using a Boosted Cascade of Simple Features", In CVPR2001, I-511-I51.8 vol. 1, 2001) for the HOG characteristic amount of the image (for example, see N. Dalal and B. Trigs, "Histograms of oriented gradients for human detection", In CVPR2005, pp. 886-893 vol. 1, 2005), from a large number of images obtained by capturing a variety of initial formations in a variety of lighting conditions. Then, play start estimator 220 detects, for example, an initial formation and its position, from a video, by using such a discriminator.

Figure 7:
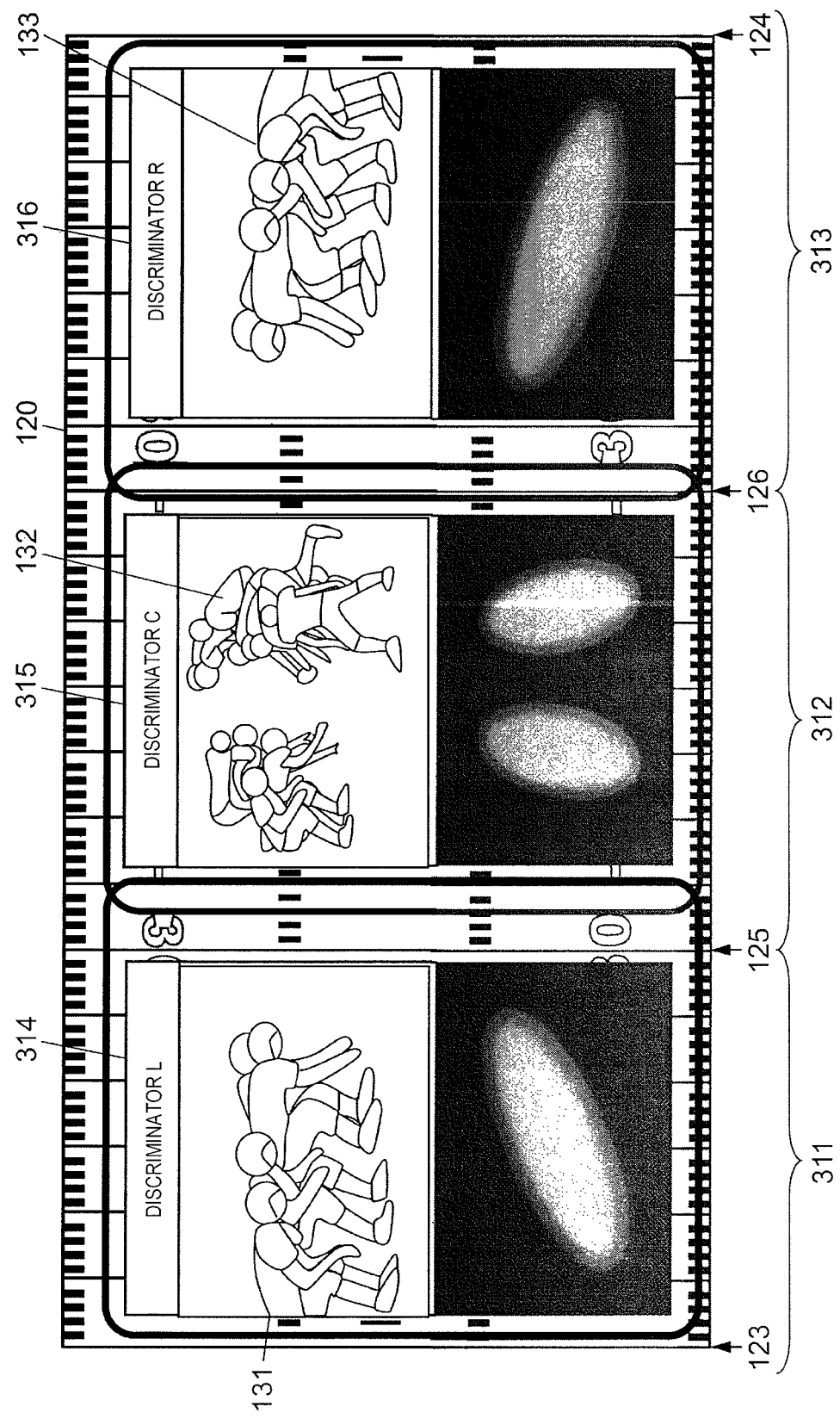
FIG. 7 is an explanatory diagram illustrating an example of a discriminator in the present embodiment.

FIG. 7 is an explanatory diagram illustrating an example of a discriminator for detecting the initial formation.

As described above, the shape on the video of the initial formation is less variable, but changes according to the position where the initial formation is assembled.

Thus, as illustrated in FIG. 7, play start estimator 220 divides; for example, field 120 into three areas: left area 311, central area 312, and right area 313, with inbounds lines 125 and 126 which are away by 35 yards from both goal lines 123 and 124 as boundaries.

Play start estimator 220 uses discriminator L314 generated from the initial formation which is assembled in left area 311, for left area 311. Similarly, play start estimator 220 uses discriminator C315 generated from the initial formation which is assembled in central area 312, for central area 312, and uses discriminator R316 generated from the initial formation which is assembled in right area 313, for right area 313.

That is, play start estimator 220 searches an entire screen while changing a discriminator depending on each area.

Figure 8:
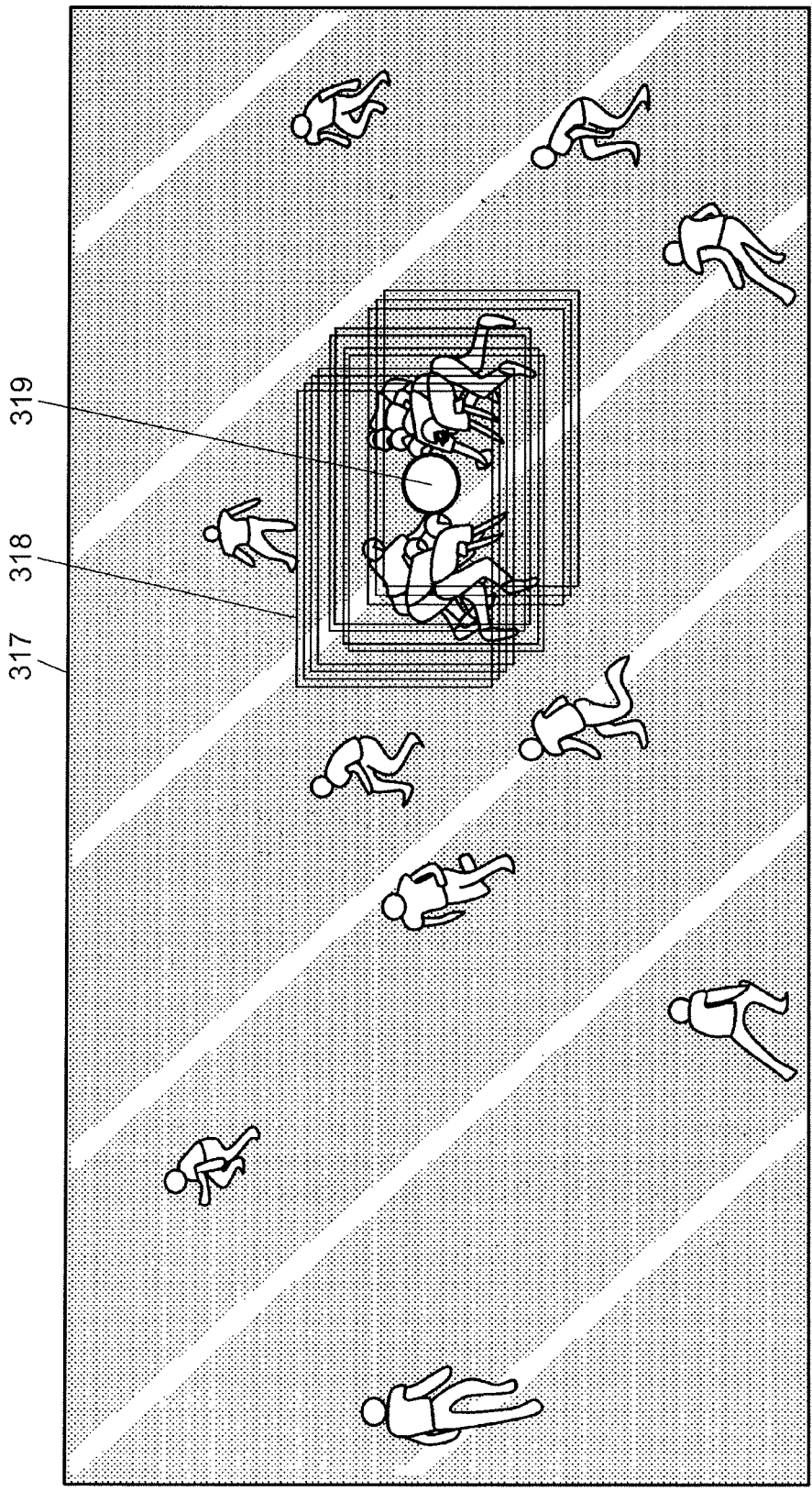
FIG. 8 is an explanatory diagram illustrating an example of a state of estimation of a play start position in the present embodiment.

FIG. 8 is an explanatory diagram illustrating an example of a state of estimation of a play start position.

As illustrated in FIG. 8, play start estimator 220 obtains, for example, a plurality of regions 318, as a detection result of the initial formation, from video 317, by using an estimation device. Play start estimator 220 estimates position 319 of the center of gravity of the plurality of regions 318 which are detected by the estimation device, as a play start position.

In addition, play start estimator 220 may perform projective transformation on the play start position on the video, into fields 120 (bird's eye view image), and use the position after conversion (for example, field grid), as the play start position. Such projective transformation is performed, for example, by using a predetermined projective transformation matrix. The projective transformation matrix is calculated in advance, based on the coordinates given manually at intervals of 10 yards for field 120 on the video.

As described above, the initial formation is assembled when the play is started. Thus, the frame from which the initial formation is detected is a frame which is likely to be a frame of the play start time.

<For Density>

In the present embodiment, the overlapping degree of the image regions of each player is employed as the density.

Figure 9:
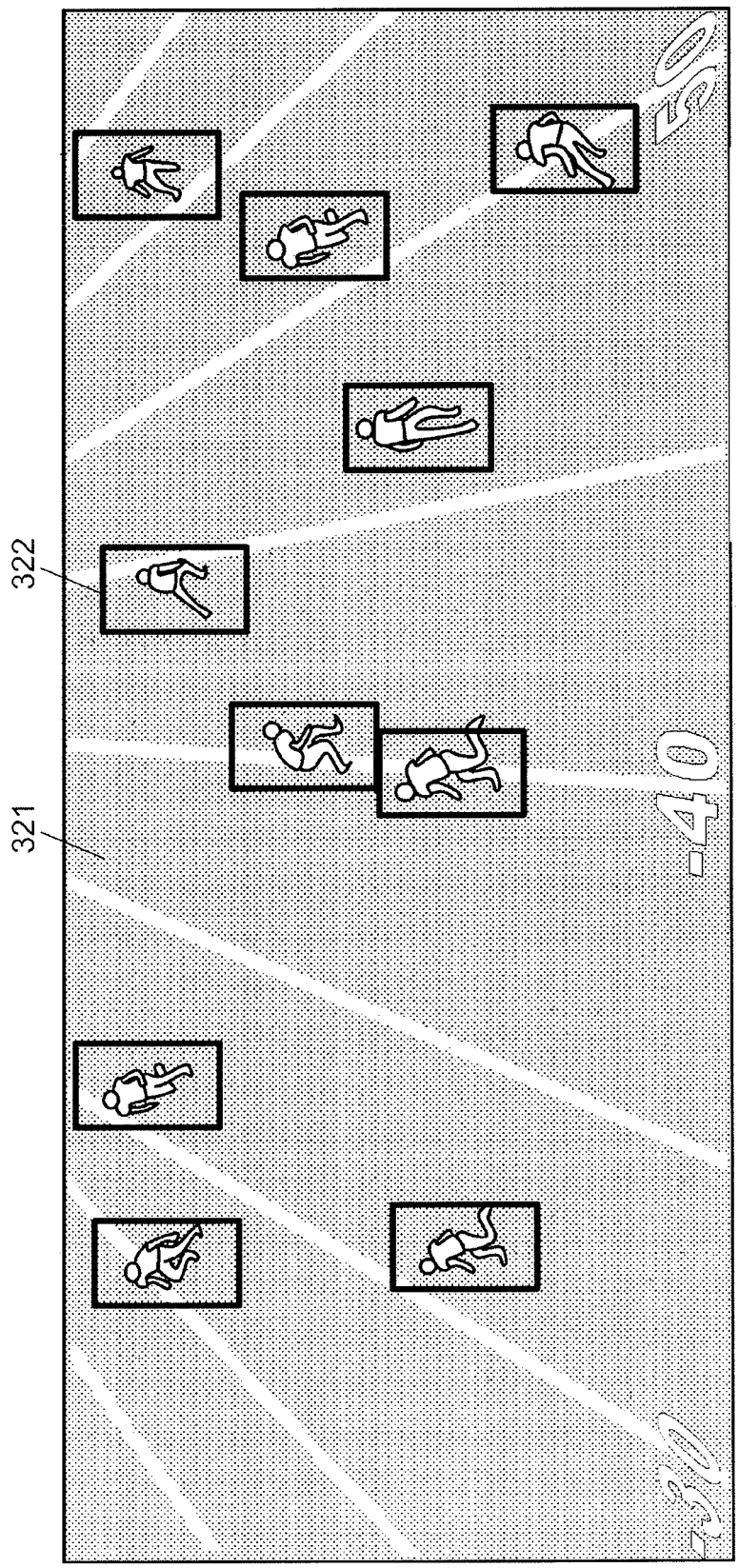
FIG. 9 is an explanatory diagram illustrating an example of a detection result of a player position in the present embodiment.
Figure 10:
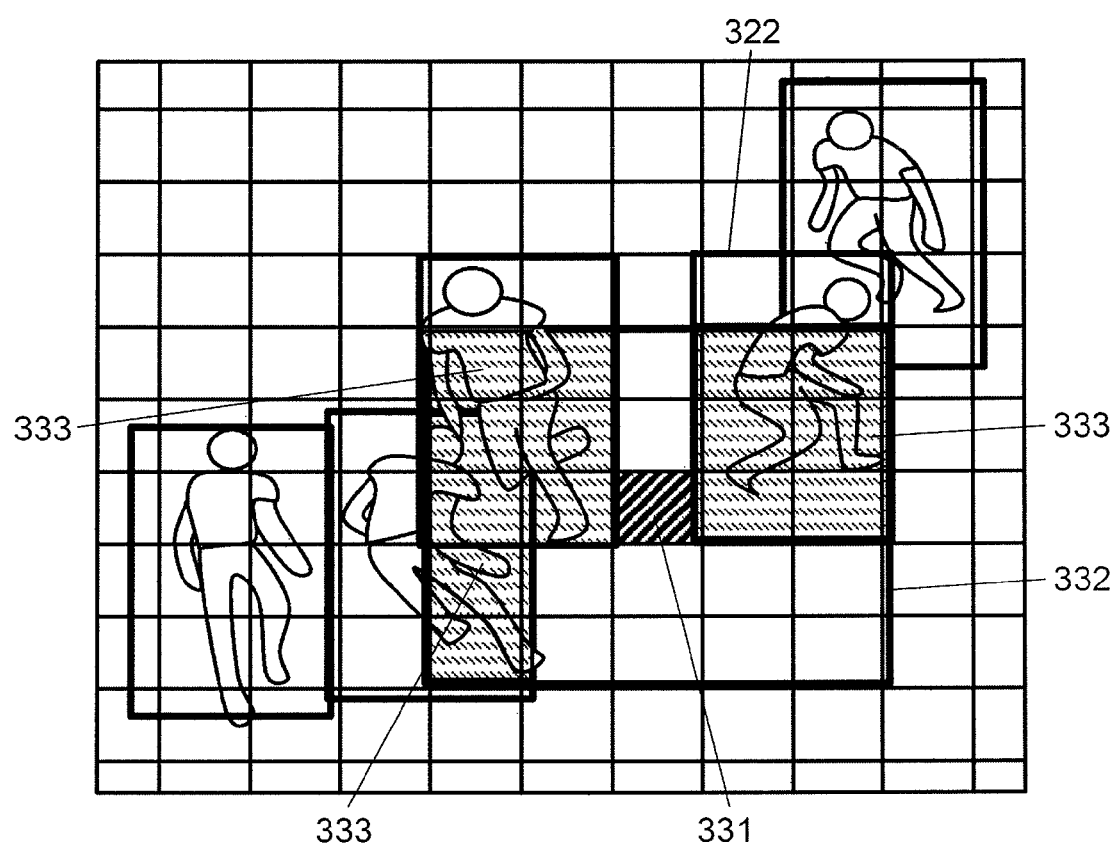
FIG. 10 is an explanatory diagram illustrating an example of a state of a calculation process of a density in the present embodiment.

FIG. 9 is an explanatory diagram illustrating an example of a detection result of a player position from a video. FIG. 10 is an explanatory diagram illustrating an example of a state of a calculation process of a density.

Play end estimator 230 previously stores, for example, a discriminator (detection device) generated by performing learning using Adaboost for the HOG feature amount of an image, from multiple images obtained by capturing players of various postures under various illumination conditions.

As illustrated in FIG. 9, play end estimator 230 detects, for example, rectangular region 322 indicating an image region occupied by each player, as the player position of each player, from video 321, using such a discriminator. Hereinafter, rectangular region 322 is referred to as a "player rectangle".

Play end estimator 230 calculates the density, from the detected player position, for each frame.

Specifically, for example, play end estimator 230 calculates the density for field grid 331, as illustrated in FIG. 10. In this case, play end estimator 230 obtains region 333 (in FIG. 10, indicated by hatching) in which rectangular region 332, that is, the region of 25 field grids in the vicinity of field grid 331 and player rectangle 322 overlap with each other.

Then, play end estimator 230 calculates the density Ldensity for field grid 331, for example, by using the following Equation (1). Here, R is the area of rectangular region 332, and Rp is the area of region 333 in which rectangular region 332 and player rectangle 322 overlap with each other.

$$L_{density} = \frac{R_p}{R} \quad (1)$$

If the density Ldensity for all of the field grids in a video is calculated, play end estimator 230 determines the position at which the density Ldensity is maximum, or the position of the center of gravity of the distribution of the density Ldensity as a dense position. As described above, the dense position is a position which is likely to be a play end position.

Figure 11:
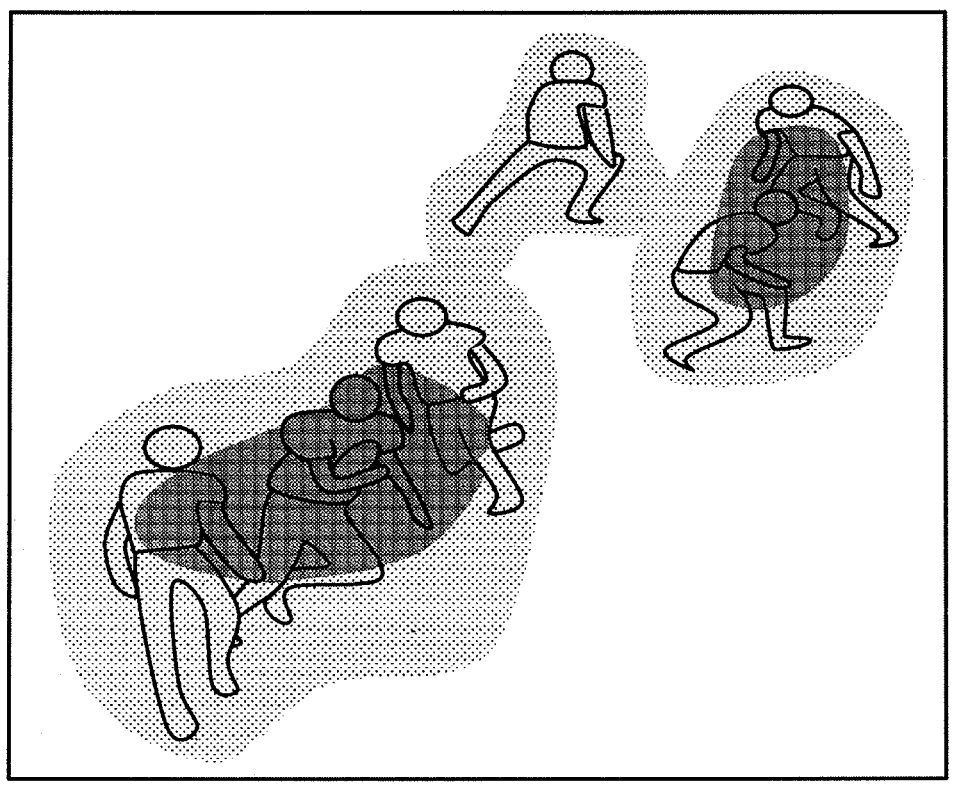
FIG. 11 is an explanatory diagram illustrating an example of a distribution of a density in the present embodiment.

FIG. 11 is an explanatory diagram illustrating an example of a distribution of a density.

As illustrated in FIG. 11, the density is higher in a region in which a plurality of players are gathered. Incidentally, play end estimator 230 may generate a density display image such as FIG. 11, in which the color and concentration are changed depending on the density of the video, and display it on the user interface. Since such an image is displayed, the user can visually confirm a position having a high density or a low density.

<For Concentration Degree>

In the present embodiment, the sum of the respective quantized optical flow intensities when propagating it along the direction of the optical flow, for each grid is employed as a concentration degree.

Figure 12A:
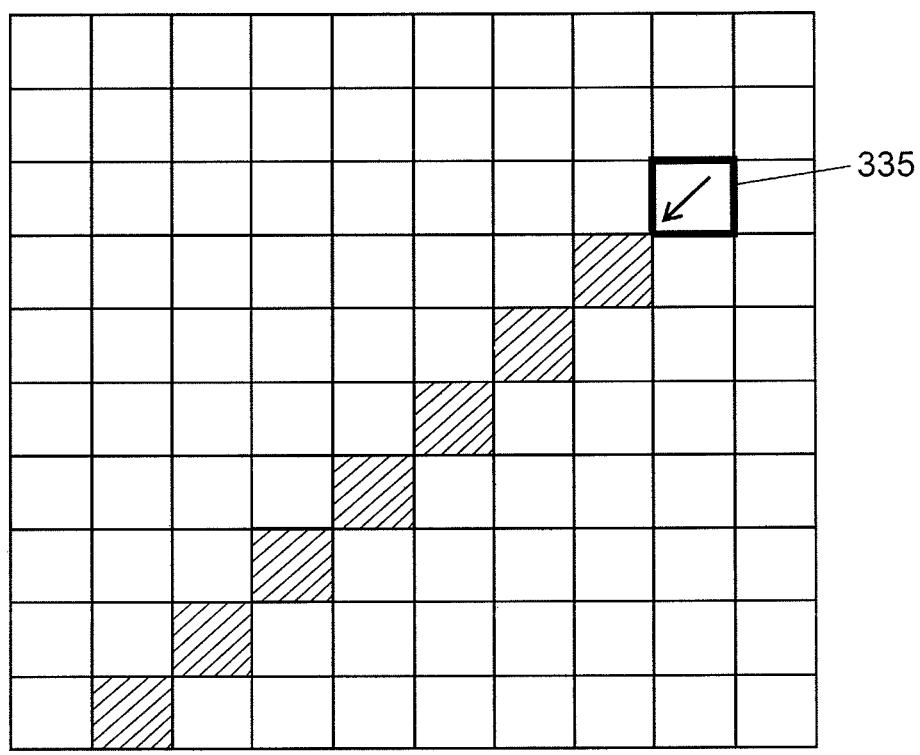
FIG. 12A is an explanatory diagram illustrating an example of a calculation method of a concentration degree in the present embodiment.
Figure 12B:
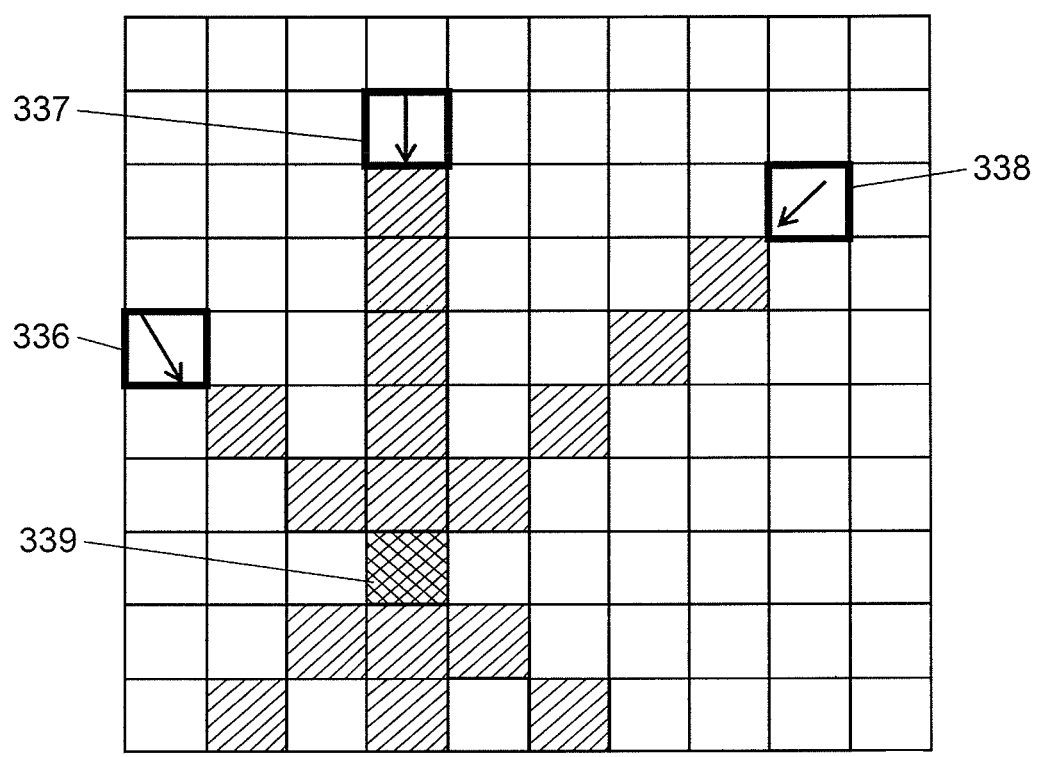
FIG. 12B is an explanatory diagram illustrating an example of the calculation method of the concentration degree in the present embodiment.

FIGS. 12A and 12B are explanatory diagrams illustrating an example of a calculation method of the concentration degree.

As illustrated in FIG. 12A, it is assumed that there is an optical flow in a direction of lower-left 45 degrees, in position 335. In this case, play end estimator 230 increases the concentration degree of each of a plurality of field grids (in FIG. 12A, indicated by hatching) which are present in the lower-left 45 degree direction from position 335, for example, by one.

Play end estimator 230 performs the same processing for the optical flow in all other positions. As a result, for example, as illustrated in FIG. 12B, the concentration degree increases in field grid 339 at which the directions of the optical flows of a plurality of positions 336, 337, and 338 overlap with each other.

In this way, the concentration degree of each field grid is calculated by performing processing for the optical flows in all positions. The field grid having a maximum concentration degree is estimated as a position to which the movements of more players are headed.

As the player is closer to a ball, there is a higher tendency that the player goes aggressively to the ball. Therefore, play end estimator 230 may perform weighting according to a distance from each position to a field grid of which the concentration degree is to be increased.

Further, in a case where many players move away from a certain field grid, there is a low possibility that the ball is positioned in such a field grid. Therefore, play end estimator 230 may give a negative value to a field grid located in the front in the opposite direction of the direction of the optical flow. This can further improve the accuracy.

Specifically, play end estimator 230, for example, calculates the concentration degree of each field grid, according to the following steps.

First, play end estimator 230 quantizes the optical flow intensity of each field grid into eight directions.

Figure 13:
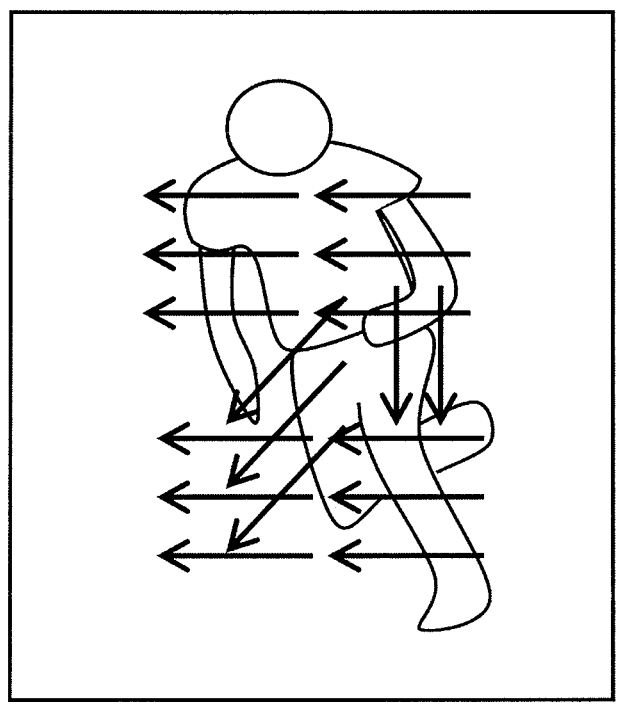
FIG. 13 is a diagram illustrating an example of an optical flow which is quantized in the present embodiment.

FIG. 13 is a diagram illustrating an example of an optical flow which is quantized.

As illustrated in FIG. 13, for example, the movement of each player is defined by being quantized in eight directions, in respective parts of a region in which each player is displayed.

Play end estimator 230 increases the concentration degrees of all field grids located on the extension line in the direction of each optical flow, by a value inversely proportional to the distance.

Further, play end estimator 230 reduces the concentration degrees of all field grids located on the extension line in the opposite direction of the quantization direction, by a value proportional to the distance.

Then, play end estimator 230 calculates the concentration degree Ldirection for each field grid, for example, by using the following Equations (2) to (4). Ldirection_direct in Equation (2) represents the concentration degree for the direction of the optical flow. Ldirection_opposite in Equation (3) represents the concentration degree for the opposite direction of the optical flow. Here, grid represents all field grids in a field or a video, and dis(grid) represents a distance from a field grid which is subjected to calculation of the concentration degree Ldirection to the field grid indicated by grid. In Equation (4), w1 represents the weighting for Ldirection_direct and w2 represents the weighting for Ldirection_opposite.

$$L_{direction\_direct} = \sum_{grid} \frac{1}{dis(grid)} \quad (2)$$

$$L_{direction\_opposite} = \sum_{grid} -dis(grid) \quad (3)$$

$$L_{direction} = w1 * L_{direction_{direct}} + w2 * L_{direction\_opposite} \quad (4)$$

If the concentration degree Ldirection for all of the field grids in a field or a video is calculated, play end estimator 230 determines the position at which the concentration degree Ldirection is maximum, or the position of the center of gravity of the distribution of the concentration degree Ldirection as a concentrated position.

Figure 14:
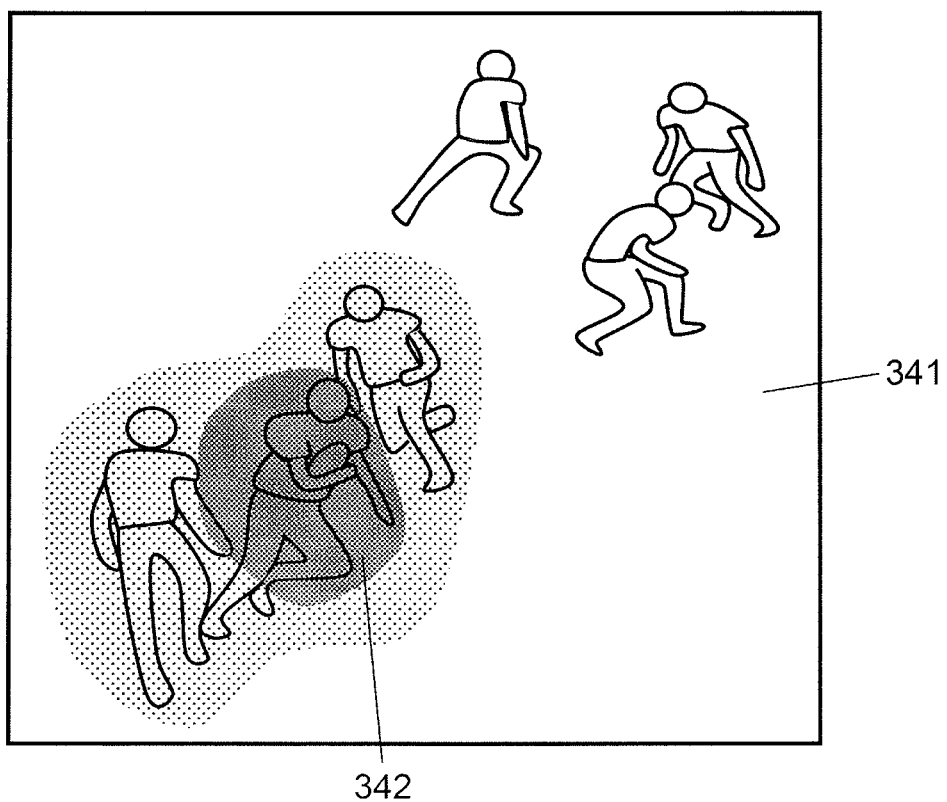
FIG. 14 is an explanatory diagram illustrating an example of a concentrated position in the present embodiment.

FIG. 14 is an explanatory diagram illustrating an example of a concentrated position.

As illustrated in FIG. 14, any position in the field region of video 341 is determined as concentrated position 342. As described above, similar to the dense position, concentrated position 342 is also a position which is likely to be the play end position.

<Operation of Video Processing Device>

Next, the operation of video processing device 200 will be described.

Incidentally, as described above, the process of each following unit is realized by a processor (CPU) included in a video processing device executing a control program.

Figure 15:
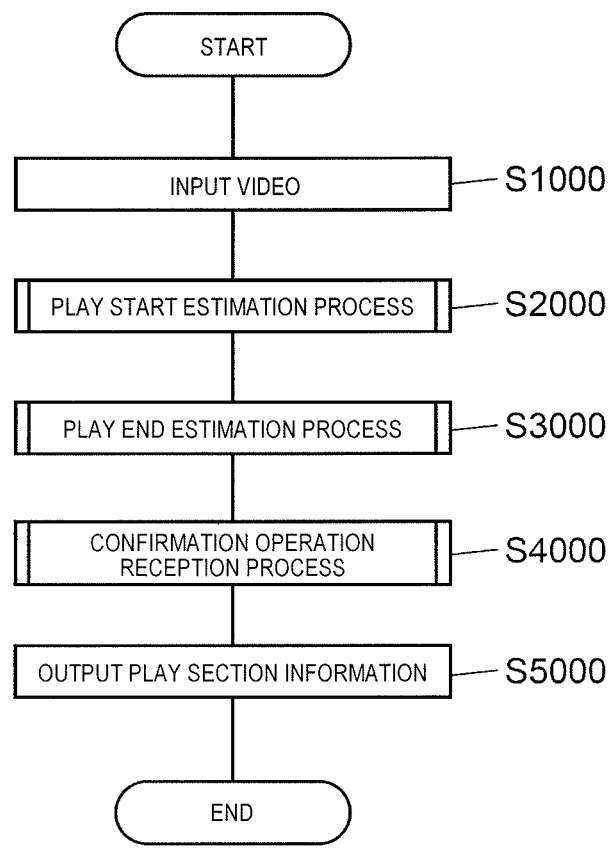
FIG. 15 is a flowchart illustrating an example of an operation of the video processing device according to the present embodiment.

FIG. 15 is a flowchart illustrating an example of an operation of video processing device 200.

In step S1000, video input unit 210 inputs video obtained by capturing an American football game.

In step S2000, play start estimator 220 performs a play start estimation process for estimating the play start frame and the play start position.

In step S3000, play end estimator 230 performs a play end estimation process for estimating the play end frame and the play end position.

In step S4000, confirmation operation receiver 240 performs a confirmation operation reception process for accepting a confirmation operation for the estimated results of steps S2000 and S3000, from the user.

In step S5000, estimate result processor 250 outputs the play section information, which is a confirmation operation result in step S4000, indicating the play start frame and the play end frame, which are estimated.

Below, the play start estimation process, the play end estimation process, and the confirmation operation reception process will be described in detail.

<Play Start Estimation Process>

Figure 16:
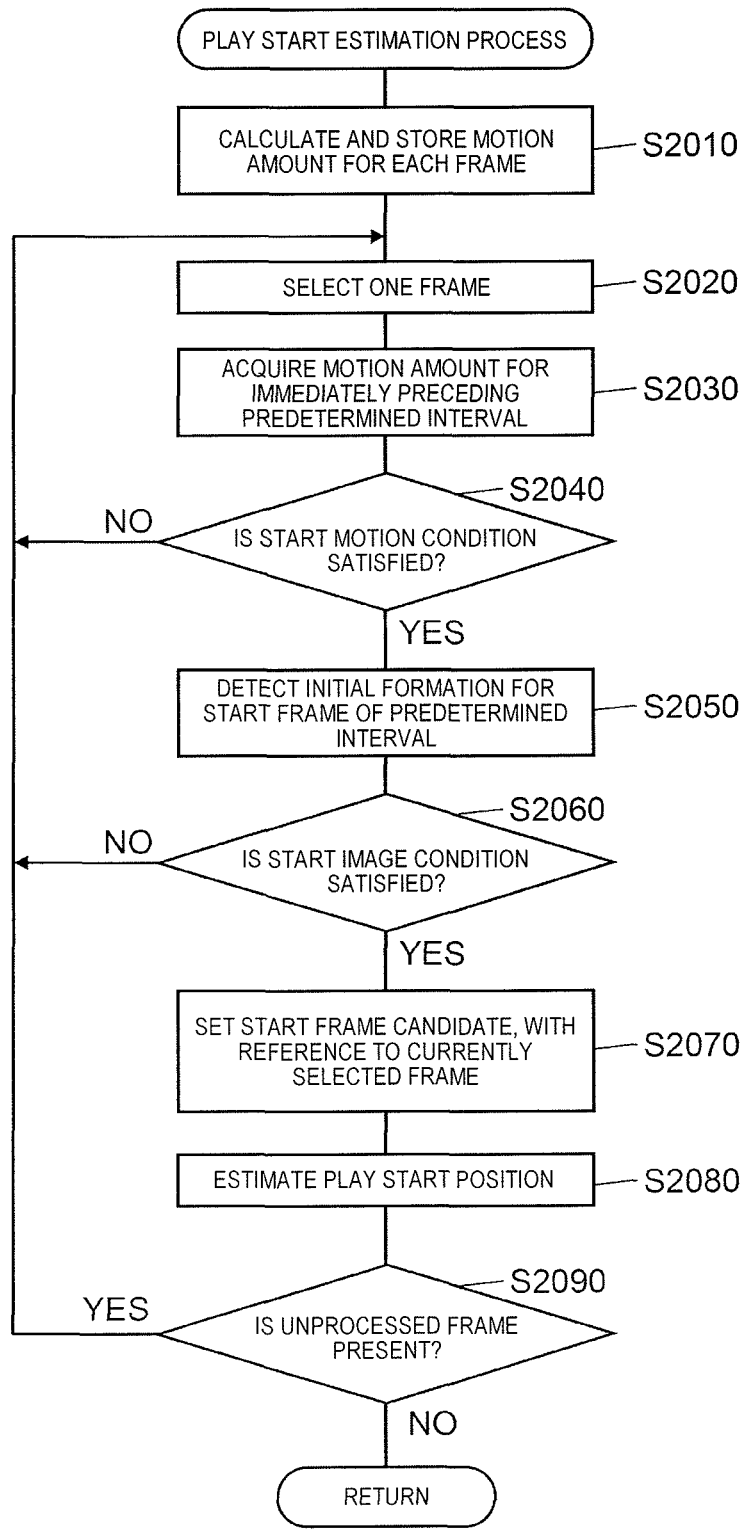
FIG. 16 is a flowchart illustrating an example of a play start estimation process in the present embodiment.

FIG. 16 is a flowchart illustrating an example of a play start estimation process.

In step S2010, play start estimator 220 calculates the motion amount (optical flow intensity) for each grid of each frame of the video, and stores the calculation result in the memory.

In step S2020, play start estimator 220 selects a single frame from the video, for example, in the form to continue to select a frame from the beginning of the video in order.

In step S2030, play start estimator 220 acquires the motion amount, for a predetermined interval immediately before the currently selected frame. The predetermined interval herein is, for example, an interval, from the frame before 120 frames than the currently selected frame, to the currently selected frame.

As described above, because the movements of most of the players increase rapidly when the play is started, the total optical flow intensity also increases rapidly (see FIG. 6).

Therefore, in step S2040, play start estimator 220, first, sums all of the optical flow intensities in the frame, for each frame, for all frames of the predetermined interval, and calculates the total optical flow intensity. Then, play start estimator 220 determines whether or not a predetermined start motion condition is satisfied, which corresponds to a rapid increase of the motion amount, using the calculated total optical flow intensity of each frame.

The start motion condition is, specifically, for example, a condition that all of the following Equations (5) to (7) are satisfied.

$$\text{optical}[0] - \text{optical}[i] > 0 (1 \leq i \leq L) \quad (5)$$

$$\text{optical}[0] > \frac{\text{optical}_{Max}}{M} \quad (6)$$

$$\text{optical}[L] > N \quad (7)$$

Here, optical[ ] indicates the total optical flow intensity. L, M, and N are constants which are respectively predetermined from experiments or the like. L is an integer of 2 or more, for example, 120. M is, for example, 2. N is, for example, 20. For example, optical[0] indicates the total optical flow intensity of the currently selected frame, and optical[120] is the total optical flow intensity of the frame located before 120 frames from the currently selected frame. The opticalMax is the maximum value of the total optical flow intensity, which is calculated using the portion for the first 5 minutes of a video (in other words, a video of one game used for analysis). Play start estimator 220 calculates, for example, the opticalMax, and stores it in the memory, when first performing the process of step S2040.

In addition, the start motion condition is not limited to the above-mentioned content. For example, a condition that the moving average of the amounts of a change in the total optical flow intensity is a predetermined value or more, a condition that a change rate of the amounts of a change in the total optical flow intensity is a predetermined value or more, or the like may be employed as the start motion condition.

Further, the start motion condition may include other conditions such as a condition that the elapsed time from the most previous play start frame is equal to or greater than a predetermined threshold value.

In a case where the start motion condition is not satisfied (S2040: NO), play start estimator 220 returns to the process of step S2020, and moves to the process on unprocessed frames, that is, the frames which are not selected in step S2020. Further, in a case where the start motion condition is satisfied (S2040: YES), play start estimator 220 proceeds to the process of step S2050.

In step S2050, play start estimator 220 performs an initial formation detection for the start frame of a predetermined interval.

In step S2060, play start estimator 220 determines whether or not a predetermined start image condition is satisfied, which corresponds to the initial formation being displayed in the frame. Here, the start image condition is, for example, a condition that the initial formation is detected from the video, with a likelihood of more than a predetermined value.

In a case where the start image condition is not satisfied (S2060: NO), play start estimator 220 returns to the process of step S2020, and moves to the process for the unprocessed frame. Further, in a case where the start image condition is satisfied (S2060: YES), play start estimator 220 proceeds to the process of step S2070.

Such a determination process is able to prevent erroneous detection for the frame having a high density at a time other than the play start time, such as a frame at the time of player change.

In step S2070, play start estimator 220 sets a start frame candidate, with reference to the currently selected frame. Specifically, play start estimator 220 sets, for example, the start frame at a predetermined time, as the start frame candidate. The start frame candidate is a group of frames that are candidates for the play start frame.

In step S2080, play start estimator 220 estimates a play start position. Specifically, play start estimator 220 sets, for example, the position of the detected initial formation as the play start position.

Then, in step S2090, play start estimator 220 determines whether or not an unprocessed frame is present in the video. In a case where an unprocessed frame is present (S2090: YES), play start estimator 220 returns to the process of step S2020, and moves to the process for the unprocessed frame. Further, in a case where the process for all of the frames is completed (S2090: NO), play start estimator 220 proceeds to the process of step S3000 (play end estimation process) of FIG. 15.

<Play End Estimation Process>

Figure 17:
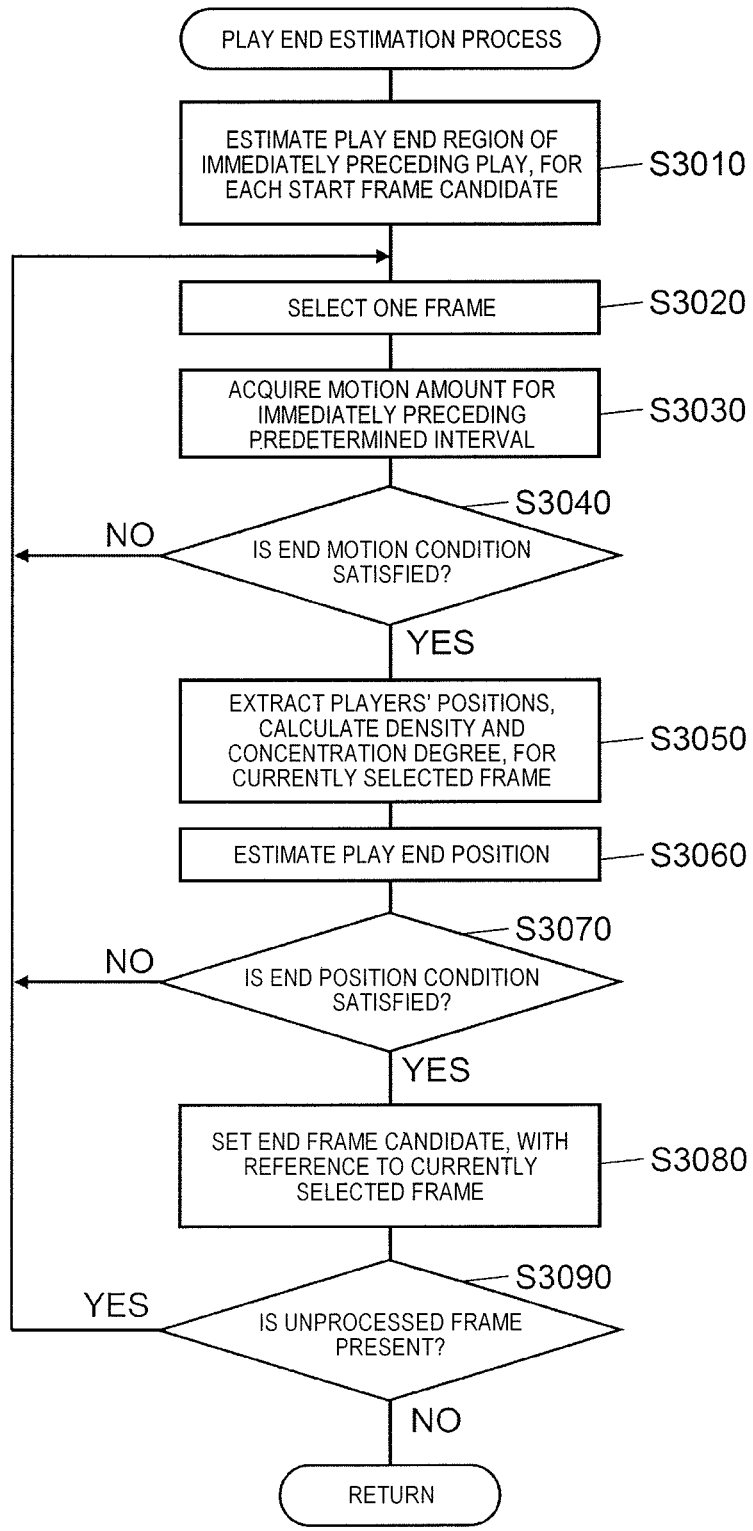
FIG. 17 is a flowchart illustrating an example of a play end estimation process in the present embodiment.

FIG. 17 is a flowchart illustrating an example of a play end estimation process.

In step S3010, play end estimator 230 estimates the frame end region of a play immediately before the corresponding play (immediately preceding play), for each of the start frame candidates which are set by the play start estimation process (see FIG. 16).

As described above, the play end position has correlation with the play start position of a one-subsequent play. Thus, play end estimator 230 performs estimation of the play end regions, in order to limit the region at the play end position of the immediately preceding play, based on the play start position, for each of the start frame candidates. In addition, information obtained from the start frame information which is output by play start estimator 220 is used as the play start frame and the play start position.

Specifically, play end estimator 230 draws a vertical line from the play start position to the side lines 121 and 122 (see FIG. 2) close thereto, and estimates a region of a width of 10 yards in the video, centered on the vertical line, as the play end region. In addition, the number of 10 yards is an example, and it goes without saying that it is important to define a predetermined region on the basis of the play start position when setting the play end region.

In step S3020, play end estimator 230 selects a single frame from the video, for example, in the form to continue to select a frame from the beginning of the video or from the frame immediately after a start frame candidate in order.

In step S3030, play end estimator 230 acquires the motion amount, for a predetermined interval immediately before the currently selected frame.

The predetermined interval herein is, for example, an interval, from the frame before 120 frames than the currently selected frame, to the currently selected frame.

As described above, because the movements of most of the players decrease rapidly at the time of end of play, the total optical flow intensity also decreases rapidly (see FIG. 6).

Therefore, in step S3040, play end estimator 230, first, calculates the total optical flow intensity, for each frame, for all frames of the predetermined interval. Then, play end estimator 230 determines whether or not a predetermined end motion condition is satisfied, which the motion amount rapidly decreases and a change amount of the motion amount is smooth, by using the calculated total optical flow intensity of each frame.

The end motion condition is, specifically, for example, a condition that both following Equations (8) and (9) are satisfied.

$$\text{optical}[0] - \text{optical}[i] < 0 \ (0 \le i \le P) \quad (8)$$

$$|\text{optical}[j] - \text{optical}[j+Q]| > \frac{\text{optical}_{Max}}{R} \ (0 \le j \le P) \quad (9)$$

Here, P and Q are constants which are respectively predetermined from experiments or the like. P is an integer of 1 or more, for example, 120. Q is an integer of 1 or more, for example, 5. R is, for example, 15.

In addition, the end motion condition is not limited to the above-mentioned content. For example, a condition that the moving average of the amounts of a change in the total optical flow intensity is a negative predetermined value or less, a condition that a change rate of the amounts of a change in the total optical flow intensity is a negative predetermined value or less, or the like may be employed as the end motion condition.

Further, the end motion condition may further include other conditions that the elapsed time from the start frame of the immediately preceding play is a predetermined threshold or less, or the elapsed time to the start frame of the immediately following play is a predetermined threshold or less.

In a case where the end motion condition is not satisfied (S3040: NO), play end estimator 230 returns to the process of step S3020, and moves to the process on unprocessed frames, that is, the frames which are not yet selected in step S3020. Further, in a case where the end motion condition is satisfied (S3040: YES), play end estimator 230 proceeds to the process of step S3050.

As mentioned above, players are likely to gather toward the play end position.

Then, in step S3050, play end estimator 230 extracts the players' positions, and calculates the dense position and the concentrated position, for the currently selected frame. In step S3060, play end estimator 230 estimates an intermediate position between the dense position and the concentrated position, as a play end position.

In other words, play end estimator 230 extracts the players' positions for the currently selected frame, and calculates the density Ldensity and concentration degree Ldirection from the extracted players' positions. Finally, the play end position is estimated by calculating play end position likelihood Lterminal by using the results.

Here, Lterminal can be calculated, by obtaining the sum of the density Ldensity and the concentration degree Ldirection for each position, and a position at which is the sum is a maximum value. Further, Lterminal may be calculated by obtaining the sum of the density Ldensity and the concentration degree Ldirection for each position, and a position which is a midpoint between positions of two points having the peak values. In addition, similar to the play start position, in a case where a play end position is calculated as a position on the video, play end estimator 230 performs projective transformation of the position on the video, to field 120 (bird's eye view image), and estimates the position after conversion (for example, a field grid) as a final play end position.

In step S3070, play end estimator 230 determines whether or not the play end position satisfies the end position condition. Here, the end position condition is a predetermined end position condition that the play end position and the play start position of a one-subsequent play have a correlation, and a condition that the play end position is included in the play end region in the present embodiment. The play start position herein is, for example, a play start position of a play start frame which is first present after the currently selected frame.

In a case where the end position condition is not satisfied (S3070: NO), play end estimator 230 returns to the process of step S3020, and moves to the process for the unprocessed frame. Further, in a case where the end position condition is satisfied (S3070: YES), play end estimator 230 proceeds to the process of step S3080.

In step S3080, play end estimator 230 sets end frame candidates, with reference to the currently selected frame. Specifically, play start estimator 220 sets, for example, the currently selected frame as an end frame candidate.

Then, in step S3090, play end estimator 230 determines whether or not an unprocessed frame is present in the video. In a case where an unprocessed frame is present (S3090: YES), play end estimator 230 returns to the process of step S3020, and moves to the process for the unprocessed frame. Further, in a case where the process for all of the frames is completed (S3090: NO), play end estimator 230 proceeds to the process of step S4000 (confirmation operation reception process) of FIG. 15.

<Confirmation Operation Reception Process>

Confirmation operation receiver 240 receives a confirmation operation, by using a confirmation operation reception screen, in the confirmation operation reception process. Prior to the description of the confirmation operation reception process, an overview of the confirmation operation reception screen will be described.

Figure 18:
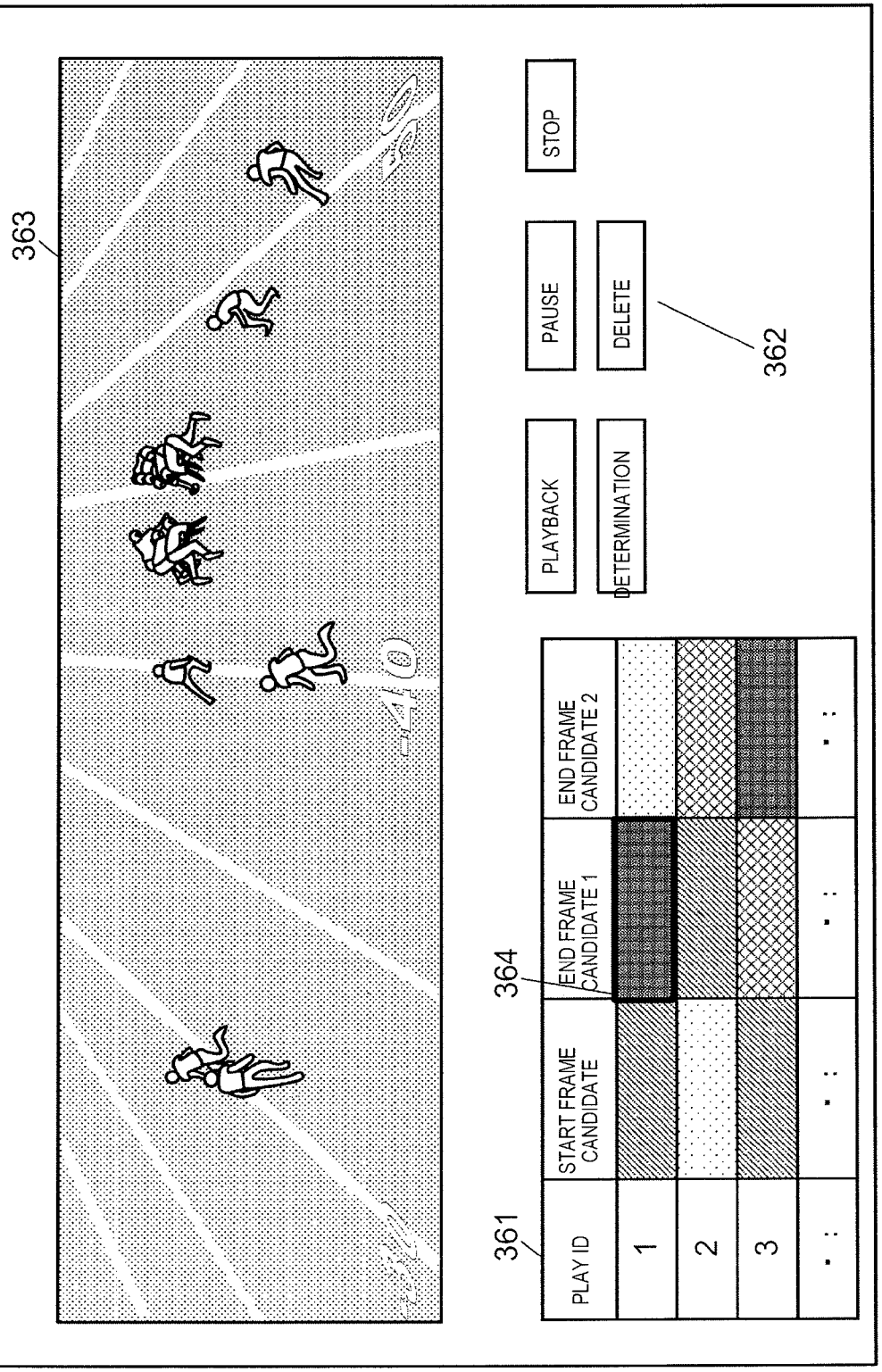
FIG. 18 is a plan view illustrating an example of a confirmation operation reception screen in the present embodiment.

FIG. 18 is a plan view illustrating an example of a confirmation operation reception screen.

As illustrated in FIG. 18, confirmation operation reception screen 360 includes, for example, candidate display selection region 361, operation button region 362, and video display region 363.

When a plurality of start frame candidates are estimated, candidate display selection region 361 arranges and displays the thumbnails of the plurality of start frame candidates in a vertical direction in time series. Candidate display selection region 361 arranges and displays the thumbnail of each of the start frame candidates and the thumbnails of the representative images of the end frame candidates which are estimated as the end frame of the play corresponding to the start frame candidate in a horizontal direction.

With such display, the thumbnails of the end frame candidates of the immediately preceding play are displayed on a one row of the thumbnail of the start frame candidate of a certain play. In other words, candidate display selection region 361 arranges and displays the start frame candidate of a play, and the end frame candidates of the immediately preceding play, for each play, by a placement method of each candidate.

In addition, each thumbnail is generated by converting the representative image of each of the start frame candidates or the end frame candidates into a low image. The representative image will be described later in detail.

Operation button region 362 displays a playback button, a pause button, a stop button, a determination button, and a delete button for respectively accepting a playback operation, a pause operation, a stop operation, a determination operation, and a delete operations, with respect to the display items that are selected in candidate display selection region 361.

Video display region 363 is a region for displaying representative images corresponding to the designated thumbnails, or a video section including the start frame candidates or the end frame candidates corresponding to the designated thumbnails. The video section will be described later in detail.

In addition, the size, shape, and arrangement of each portion constituting confirmation operation reception screen 360 are not limited to the example illustrated in FIG. 18. For example, candidate display selection region 361 may arrange and display the thumbnails of the representative images of a plurality of start frame candidates in time series along the horizontal direction, and may arrange and display the thumbnails of the representative images of the end frame candidates corresponding to the thumbnails of the representative image of each of the start frame candidates in time series along the vertical direction. Alternatively, candidate display selection region 361 may arrange and display all of the thumbnails in a column in a vertical direction and in a row in a horizontal direction, in time series.

Figure 19:
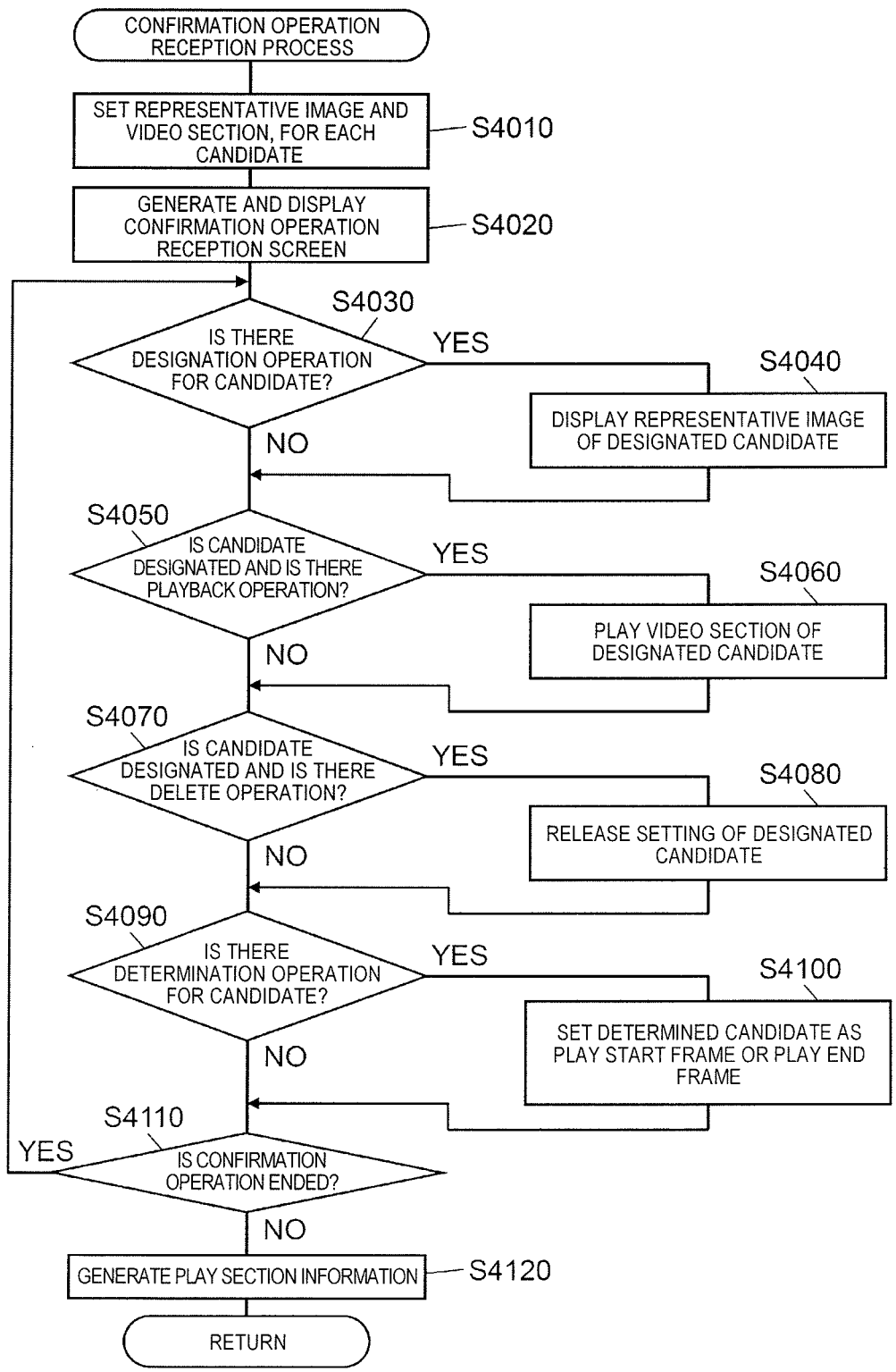
FIG. 19 is a flowchart illustrating an example of a confirmation operation reception process in the present embodiment.

FIG. 19 is a flowchart illustrating an example of a confirmation operation reception process.

In step S4010, confirmation operation receiver 240 sets a representative image and a video section, for each of the start frame candidate and the end frame candidate.

Specifically, confirmation operation receiver 240, for example, sets the start frame as a representative image, and sets a predetermined interval including the previous and subsequent frames of the start frame (for example, a section from one second before the start frame candidate to three seconds after the start frame candidate) as the video section, for the start frame candidate. Specifically, confirmation operation receiver 240, for example, sets the end frame as a representative image, and sets a predetermined interval including the end frame (for example, a section from three seconds before the end frame candidate to one second after the end frame candidate) as the video section, for the end frame candidate.

In step S4020, confirmation operation receiver 240 generates and displays the confirmation operation reception screen 360 (see FIG. 18).

In step S4030, confirmation operation receiver 240 determines whether or not the designation operation is performed for any one of the start frame candidate and the end frame candidate (hereinafter, referred to as "candidate") which are displayed on candidate display selection region 361 (see FIG. 18). In a case where the designation operation is performed (S4030: YES), confirmation operation receiver 240 progresses to step S4040. In a case where the designation operation is not performed for any candidate (S4030: NO), confirmation operation receiver 240 progresses to step S4050 described later.

In step S4040, confirmation operation receiver 240 highlights the thumbnail of the designated candidate such as superimposition of frame line 364 (see FIG. 18). Confirmation operation receiver 240 displays the representative image of the designated candidate in video display region 363 (see FIG. 18).

In step S4050, confirmation operation receiver 240 determines whether or not the playback operation is performed, in operation button region 362 (see FIG. 18), at a state where any candidate is designated. In a case where the playback operation is performed (S4050: YES), confirmation operation receiver 240 progresses to step S4060. In a case where the playback operation is not performed (S4050: NO), confirmation operation receiver 240 progresses to step S4070 described later.

In step S4060, confirmation operation receiver 240 plays the video section of the designated candidate, and displays it in video display region 363 (see FIG. 18).

In a case where the pause operation is performed in operation button region 362 (see FIG. 18) in this state, confirmation operation receiver 240 stops the playback of video section. In a case where the playback operation is performed without a new designation of the candidate, in a state where the playback is paused on the way, confirmation operation receiver 240 plays (resumes) the video section from the stopped place.

In step S4070, confirmation operation receiver 240 determines whether or not the delete operation is performed, in operation button region 362 (see FIG. 18), at a state where any candidate is designated. In a case where the delete operation is performed (S4070: YES), confirmation operation receiver 240 progresses to step S4080. In a case where the delete operation is not performed (S4070: NO), confirmation operation receiver 240 progresses to step S4090 described later.

In step S4080, confirmation operation receiver 240 releases the setting of the designated candidate, and deletes the corresponding thumbnail from candidate display selection region 361.

In step S4090, confirmation operation receiver 240 determines whether or not the determination operation is performed, in operation button region 362 (see FIG. 18), at a state where any candidate is designated. In a case where the determination operation is performed (S4090: YES), confirmation operation receiver 240 progresses to step S4100. In a case where the determination operation is not performed (S4070: NO), confirmation operation receiver 240 progresses to step S4110 described later.

In step S4100, in a case where the designated candidate is a start frame candidate, confirmation operation receiver 240 sets the candidate as the play start frame, and in a case where the designated candidate is an end frame candidate, confirmation operation receiver 240 sets the candidate as the play end frame.

In step S4110, confirmation operation receiver 240 determines whether or not the confirmation operation is ended. The case where the confirmation operation is ended is, for example, a case where the determination operation is performed, for all of the candidates which remain in candidate display selection region 361, or a case where the click operation is performed for the confirm button (not illustrated) which is displayed on confirmation operation reception screen 360.

In a case where the confirm operation is not ended (S4110: NO), confirmation operation receiver 240 returns to step S4030. In a case where the confirm operation is ended (S4110: YES), confirmation operation receiver 240 progresses to step S4120.

In step S4120, confirmation operation receiver 240 generates play section information indicating the play start frame and the play end frame, which are set by confirmation operation receiver 240. Confirmation operation receiver 240 progresses to the process of step S2000 of FIG. 15 (output of the play section information).

With such an operation, video processing device 200 is able to estimate a play section, in view of the characteristics of the movement and position of the player at the times of start and end of the play.

<Application System>

Here, a specific example of a system to which video processing device 200 according to the present embodiment is applied will be described.

Figure 20:
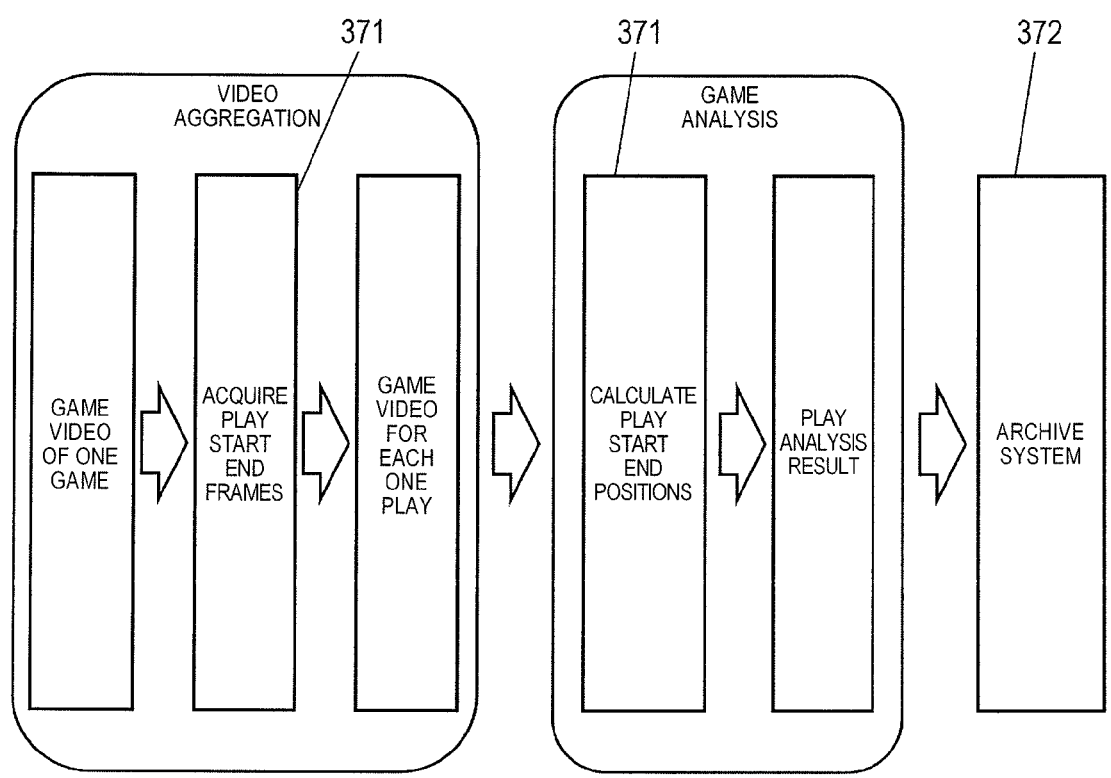
FIG. 20 is an explanatory diagram illustrating an example of a system to which the video processing device according to the present embodiment is applied.

FIG. 20 is an explanatory diagram illustrating an example of a system to which video processing device 200 is applied.

As illustrated in FIG. 20, estimate result 371 of video processing device 200 records the play in the past, and is used in archive system 372 capable of searching for similar plays later.

If the play start frame and the play end frame which are estimated by video processing device 200 are used, video aggregation of the video of one game and the calculation of the play time become possible by only using the information in the game video. Here, the video aggregation is to extract one or a plurality of play sections which are continuous in time series, and to remove a section having a low importance degree such as a timeout section.

If the play start position and the play end position which are estimated by video processing device 200 are used, the number of gain yards can be calculated, by using the video which is divided per one play by the video aggregation. Further, it is possible to realize efficient tactic analysis, by using the video of each play obtained by video aggregation.

The obtained information can be subjected to condition search and provided to an archive system, by being recorded in association with each attribute.

In this manner, since video processing device 200 is able to generate very useful information in terms of game analysis, it is suitable for various systems relating to game analysis. For example, a more detailed automatic tactical analysis is possible, by combining a ball tracking method in American football (see, for example, Junji Kurano, Taiki Yamamoto, Hirokatsu, Kataoka, Masaki Hayashi, Yoshimitsu Aoki "Ball Tracking in Team Sports by Focusing on Ball Holder Candidates" In International Workshop on Advanced Image Technology 2014. (IWAIT2014), 2014), and a player tracking method using a uniform number recognition (see, for example, Taiki Yamamoto, Hirokatsu Kataoka, Masaki Hayashi, Yoshimitsu Aoki, "Multiple players tracking and Identification using Group Detection and player Number recognition in Sports Video." In the 39th Annual Conference of the IEEE Industrial Electronics Society (IECON2013), 2013), and the like.

<Experiment Contents and Results>

The inventor performs experiment about the accuracy of the estimation of the play section by video processing device 200 according to the present embodiment. Below, a description will be given on such experiments and their results.

<<Overview of Experiment>>

In an experiment, a video obtained by capturing a game of an American Football adult league performed in Oct. 6, 2013, with a fixed camera is used.

An experimental video has a resolution of 1740×300 pixels, and 60 fps. 1 pixel in experimental video is equivalent to about 7.3 cm in a real space, and 1 pixel in a bird's-eye view is equivalent to about 9.8 cm in a real space.

First, the learning about the image of the initial formation and the image of the player is performed by using the video of 3rd to 4th quarters. Thereafter, the accuracy evaluation experiment about video aggregation degree and the play start/end positions is performed for the video of 1st to 2nd quarters (total 224205 frames).

<<Accuracy Verification Experiment of Video Aggregation>>

The inventor has verified the accuracy of video aggregation by acquiring the play start frame and the play end frame. Specifically, a video aggregation rate C is calculated, by using the following Equation (10), by using the experimental videos (total 90,000 frames, and 32 plays). Here, framec is the total number of frames after abbreviation, and frameall is the total number of the original video frames.

$$C = \frac{frame_c}{frame_{all}} \times 100 \quad (10)$$

FIG. 21 is a diagram illustrating an accuracy verification result of video aggregation.

As illustrated in FIG. 21, the total number of plays (the number of play detections) is 31, the total number of frames after abbreviation framec is 12094, and the video aggregation rate (video aggregation level) C is 13.44, by using ground truth and the present method.

<<Accuracy Verification Experiment of Play Start Position>>

In the accuracy evaluation experiment of the play start position, the accuracy comparison is performed by comparing the ground truth which is manually given and a Euclidean distance, in the field image after projective transformation.

FIG. 22 is a diagram illustrating an accuracy verification result of a play start position.

As illustrated in FIG. 22, as the accuracy evaluation of the play start position, an average error 17.00, a minimum error 2.23, and a maximum error 42.19 are obtained.

<<Accuracy Verification Experiment of Play End Position>>

In American football, in a case where pass is failed such as a case where pass does not come into contact with any one and goes outside, the play is started again from the same place. Thus, the accuracy evaluation experiment of the play end position is performed for total 15 videos, except for such a case. A Euclid distance comparison between the end position which is manually given and the end position calculated by this method is performed, in a bird's eye view image after the projective transformation.

FIG. 23 is a diagram illustrating an accuracy verification result of a play end position.

As illustrated in FIG. 23, as the accuracy evaluation of the play start position, an average error 45.96, a minimum error 10.98, and a maximum error 76.35 are obtained.

Thus, it is confirmed that video processing device 200 extracts the play section with enough accuracy by the experiment.

Effects of the Present Embodiment

As described above, since video processing device 200 according to the present embodiment estimates a play section, focusing on the features such as the behavior and position of a player at the start time and end time of a play, it is possible to extract a play section from a video, efficiently and with high precision.

Further, since it is possible to extract a play section from a video, efficiently and with high precision, video processing device 200 according to the present embodiment is used in various systems relating to game analysis so as to realize efficient game analysis with high precision.

After determining a play start frame and a play end frame in the form of a candidate, video processing device 200 according to the present embodiment displays a representative image and a video portion, and receives a selection operation from the user. Thus, video processing device 200 according to the present embodiment is able to more reliably prevent the play start frame and the play end frame from being estimated by mistake, and realize game analysis with high precision.

Modification Examples of the Present Embodiment

The orders of the respective processes illustrated in FIG. 15 to FIG. 17, and FIG. 19 are not limited to the examples above. For example, video processing device 200 may calculate the motion amount of a frame, every time the frame is selected, for each section required for the start motion condition or the end motion condition.

The order of the determination process of steps S4030, S4050, S4070, and S4090 in FIG. 19 may be replaced. In a stage at which two or more play start frames are estimated before the play end start process is completed for entire video, play end estimator 230 may start the play end estimation process for a section of two continuous estimated play start frames.

The video which is to be processed may be video obtained by capturing only the vicinity of the ball position.

The estimation method of the play start position is not limited to the example described above. For example, play start estimator 220 may display video, receive the manual designation of the play start position from the user, and estimate the designated position as the play start position.

Further, play start estimator 220 may not necessarily consider the correlation between the play start position and the play end position of an immediately preceding play. For example, play start estimator 220 may estimate the play start frame or the play end frame, based on only one or a plurality of a motion amount, a density, and a concentration degree.

The estimation method of the play end position is not limited to the example described above. For example, the dense position may be estimated as the play end position as it is, and the concentrated position may be estimated as the play end position as it is. For example, the position of the referee may be extracted from the image, and the position of the referee that is estimated immediately after the motion amount decreases rapidly may be estimated as the play end position.

In a case where there are already the start frame candidate and the end frame candidate, video processing device 200 may not perform the determination of the start frame candidate and the end frame candidate, but rather perform only the process after the confirmation operation reception process.

A part of video processing device 200 may be separated in such a manner that it is deployed in an external device such as a server on a network. In this case, video processing device 200 needs to include a communicator that communicates with such an external device.

Since video processing device 200 according to the present embodiment is configured to display a representative image and a video part after determining the play start frame (the start frame candidates) and the play end frame (the end frame candidate) in the form of candidates and accepts the selection operation from the user, it may be configured to determine the play start frame and the play end frame from the start frame candidate and the end frame candidate without accepting the selection operation from the user. For example, all of the start frame candidates and the end frame candidates may respectively be determined as the start frames and the end frames.

The present technology is applicable not only to the video of American football and but also to the video of other sports. In other words, the present technology is widely applicable to sports in which a play is configured with a plurality of play sections, and the movements of players are characteristic or regular at the start time or the end time of the play section.

For example, the present technology is applicable to sports having rules in which offense and defense are switched, and more specifically, it is suitable for sports in which the timing for switching between offense and defense is clearly defined on rules. Here, the switching between offense and defense includes concepts of switching between attack and defense of each team in American football, baseball, or the like, and switching of a serve right (a serve side and a receive side) in tennis, table tennis, volleyball, or the like. The present technology is suitable for sports games such as sumo and wrestling, in which the movements decrease immediately before the game starts, players are located in predetermined positions or take predetermined attitudes, and the movements increase immediately after the game starts. In addition, based on the above concept, it is considered that the present technology is especially suitable for an American football game.

<Summary of the Present Technology>

A video processing method and a video processing device of the present technology are a video processing method in which a processor performs processing on video data of video obtained by capturing a sports game, including receiving video data, calculating a motion amount of a player for each frame, from the received video data, and estimating at least one of a start frame of a play in the game, and an end frame at which an immediately preceding play, that is a one-previous play of the play, is ended, based on the calculated motion amount.

The video processing method and the video processing device may detect initial formation which is organized by players of a team of the sports, from the video data, and estimate the start frame of the play, based on the calculated motion amount and the detection result of the initial formation.

The video processing method and the video processing device may detect initial formation which is organized by players of a team of the sports, from the video data, and estimate a position of an image of the initial formation in the start frame as a start position of a play in the game.

The video processing method and the video processing device may estimate an end frame of the play, from the received video data, based on the start position.

The video processing method and the video processing device may estimate an end region of the immediately preceding play, based on the estimated start position, estimate a frame including the end position of the immediately preceding play in the game, based on the motion amount, and estimate the frame associated with the end position as the end frame, on a condition that the estimated end position is included in the estimated end region.

The video processing method and the video processing device calculate at least one of a density and a concentration degree of the player position, and estimate the end position, based on at least one of the density and the concentration degree, which are calculated.

In addition, the video processing method and the video processing device may estimate a motion increase section at which the motion amount rapidly increases, and estimate the start frame, based on the estimated motion increase section.

The video processing method and the video processing device may estimate a motion decrease section at which the motion amount rapidly decreases, and estimate the end frame, based on the estimated motion decrease section.

The video processing method and the video processing device may display the start frame and one or a plurality of end frame candidates, in association with each other, from the video data, on a screen.

The video processing method and the video processing device may receive a determination operation for the one or the plurality of end frame candidates which are displayed, and estimate the end frame candidates for which the determination operation is performed, as the end frame.

The video processing method and the video processing device may receive a playback operation for the start frame and the one or the plurality of end frame candidates which are displayed, and play and display a video data part corresponding to a section corresponding to the start frame and the end frame candidates for which the determination operation is performed, among the video data.

The video processing method and the video processing device may arrange and display the plurality of start frames in a first direction in a time series when estimating the start

INDUSTRIAL APPLICABILITY

This technology is useful as a video processing method capable of extracting a play section from a video obtained by capturing a sports game, efficiently and with high precision.

The invention claimed is:

1. A video processing method in which a processor performs processing on video data of video obtained by capturing a sports game, wherein the processor
   receives the video data,
   estimates at least one start frame of a play in the game,
   detects an initial formation which is organized by players of a team of the sports game, from the video data, and
   estimates the start frame of the play, based on a detection result of the initial formation.

2. A video processing method in which a processor performs processing on video data of video obtained by capturing a sports game, wherein the processor
   receives the video data,
   detects an initial formation which is organized by players of a team of the sports game, from the video data, and
   estimates a position of an image of the initial formation at a start frame of a play in the game as a start position of a play in the game.

3. The video processing method of claim 2,
   wherein the processor estimates an end frame of a play in the game, from the received video data, based on the start position.

4. The video processing method of claim 3, wherein the processor
   estimates an end region of an immediately preceding play, based on the start position,
   estimates a frame including an end position of the immediately preceding play in the game, based on a motion amount of a player, and
   estimates the frame corresponding to the end position as the end frame, on a condition that the end position is included in the end region.

5. The video processing method of claim 4,
   wherein the processor calculates at least one of a density and a concentration degree of a player position, and estimates the end position, based on at least one of the density and the concentration degree, which are calculated.

6. A video processing method in which a processor performs processing on video data of video obtained by capturing a sports game, wherein the processor
   receives the video data,
   estimates at least one start frame of a play in the game, and an end frame of a play in the game,
   displays the start frame and one or a plurality of end frame candidates, in association with each other, from the video data, on a screen, and
   arranges and displays a plurality of start frames in a first direction in a time series when estimating the start frame, and arrange and display each of the start frames and the end frame which is estimated for the play corresponding to the start frame, in a second direction intersecting the first direction, on a screen.

7. A video processing device in which a processor performs processing on video data of video obtained by capturing a sports game, wherein the processor
   receives the video data,
   estimates at least one start frame of a play in the game,
   detects an initial formation which is organized by players of a team of the sports game, from the video data, and
   estimates the start frame of the play, based on a detection result of the initial formation.

8. A video processing device in which a processor performs processing on video data of video obtained by capturing a sports game, wherein the processor
   receives the video data,
   detects an initial formation which is organized by players of a team of the sports game, from the video data, and
   estimates a position of an image of the initial formation at a start frame of a play in the game as a start position of a play in the game.

9. The video processing device of claim 8,
   wherein the processor estimates an end frame of a play in the game, from the received video data, based on the start position.

10. The video processing device of claim 9, wherein the processor
    estimates an end region of an immediately preceding play, based on the start position,
    estimates a frame including an end position of the immediately preceding play in the game, based on a motion amount of a player, and
    estimates the frame corresponding to the end position as the end frame, on a condition that the end position is included in the end region.

11. The video processing device of claim 10,
    wherein the processor calculates at least one of a density and a concentration degree of a player position, and estimates the end position, based on at least one of the density and the concentration degree, which are calculated.

12. A video processing device in which a processor performs processing on video data of video obtained by capturing a sports game, wherein the processor
    receives the video data,
    estimates at least one start frame of a play in the game, and an end frame of a play in the game,
    displays the start frame and one or a plurality of end frame candidates, in association with each other, from the video data, on a screen, and
    arranges and displays a plurality of start frames in a first direction in a time series when estimating the start frame, and arranges and displays each of the plurality of start frames and the end frame which is estimated for the play corresponding to the start frame, in a second direction intersecting the first direction, on a screen.

* * * * *